US012097698B2

(12) United States Patent
Morimoto et al.

(10) Patent No.: US 12,097,698 B2

(45) Date of Patent: Sep. 24, 2024

(54) HEAD SYSTEM

(71) Applicant: BROTHER KOGYO KABUSHIKI KAISHA, Nagoya (JP)

(72) Inventors: Itsuki Morimoto, Nagoya (JP); Hirotoshi Ishizaki, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 130 days.

(21) Appl. No.: 18/063,407

(22) Filed: Dec. 8, 2022

(65) Prior Publication Data

US 2023/0182466 A1 Jun. 15, 2023

(30) Foreign Application Priority Data

Dec. 10, 2021 (JP) ................................ 2021-201158

(51) Int. Cl.
*B41J 2/14* (2006.01)

(52) U.S. Cl.
CPC ........ *B41J 2/14* (2013.01); *B41J 2002/14419* (2013.01); *B41J 2002/14467* (2013.01); *B41J 2002/14475* (2013.01)

(58) Field of Classification Search
CPC ...... B41J 2/14; B41J 2/14145; B41J 2/14201; B41J 2002/14419; B41J 2002/14467; B41J 2002/14362; B41J 2002/14306; B41J 2202/20
See application file for complete search history.

(56) References Cited

U.S. PATENT DOCUMENTS

| | | | | |
|---|---|---|---|---|
| 2017/0197435 | A1 | 7/2017 | Yamamoto et al. | |
| 2020/0282723 | A1 | 9/2020 | Kinoshita | |
| 2020/0307201 | A1 * | 10/2020 | Kishigami | B41J 2/175 |
| 2021/0146692 | A1 | 5/2021 | Sohgawa | |
| 2021/0170747 | A1 * | 6/2021 | Katayama | B41J 2/14209 |
| 2021/0300037 | A1 | 9/2021 | Ishizaki et al. | |
| 2021/0300038 | A1 * | 9/2021 | Morimoto | B41J 2/175 |

FOREIGN PATENT DOCUMENTS

| | | | |
|---|---|---|---|
| JP | 2021-79616 | A | 5/2021 |
| JP | 2021-160345 | A | 10/2021 |
| JP | 2021-160346 | A | 10/2021 |

OTHER PUBLICATIONS

European Patent Office, Extended European Search Report issued in European Patent Application No. 22212492.7, mailed Apr. 28, 2023.

* cited by examiner

*Primary Examiner* — Scott A Richmond
(74) *Attorney, Agent, or Firm* — Baker Botts L.L.P.

(57) ABSTRACT

There is provided head system including: head and channel member. The head includes four manifolds each having: common channel extending in first direction and inlet connected to the common channel. The four manifolds include first to fourth manifolds. The channel member includes: first member having supply port, and second member. The channel member is formed with first to fourth supply channels extending between the supply port and the inlet of the first to fourth manifolds, respectively. In two of the four manifolds, the inlet is connected to end on first side of the common channel, and in remaining two of the four manifolds, the inlet is connected to end on second side of the common channel. Each of the third and fourth supply channels is formed in both the first and second members.

15 Claims, 11 Drawing Sheets

HEAD SYSTEM

REFERENCE TO RELATED APPLICATIONS

This application claims priority from Japanese Patent Application No. 2021-201158 filed on Dec. 10, 2021. The entire content of the priority application is incorporated herein by reference.

BACKGROUND ART

A head system which is provided with a plurality of nozzle arrays, a head having a plurality of manifolds supplying a liquid to the plurality of nozzle arrays, and a channel member supplying the liquid to the head, and which is configured to form an image on a medium by discharging the liquid from the plurality of nozzle arrays of the head, is used.

It is known a head system having a head having four manifolds and four nozzle arrays connected to the four manifolds respectively, and a channel member supplying a liquid to the four manifolds in the head so that the liquid flows in opposite directions between the manifolds adjacent to each other (so-called “cross flow”).

DESCRIPTION

When the liquid is supplied to the plurality of manifolds in the head by cross flow, the structure of the channel member may be complicated, which may cause an increase in size of the channel member and, in turn, may cause an increase in size of the head system.

Specifically, for example, as in Japanese Patent Application Laid-Open No. JP2021-160345, in a channel member, which configures two lines of channels separated by a rubber sheet, and which has two supply ports and two discharge ports, two ink supply pipes and two ink discharge pipes are required to connect the channel member and a sub-tank. Therefore, the structure of a connector (joint) for connecting the four pipes (that is, two ink supply pipes and two ink discharge pipes) and the channel member becomes complicated, and the head system becomes large, for example in the up and down direction (height direction). In addition, since two lines of branched channels extending from the supply port to both sides in the medium width direction (the direction in which the nozzle array extends) are configured inside the channel member, and two lines of branched channels extending from the discharge port to both sides in the medium width direction are also configured inside the channel member, the total length of the channel inside the channel member becomes large, and the size of the channel member itself becomes large.

An object of the present disclosure is to provide a head system which is capable of supplying a liquid to a plurality of manifolds in a head by cross flow while suppressing an increase in size of the head system.

According to a first aspect of the present disclosure, there is provided a head system including: a head configured to discharge a liquid; and a channel member arranged above the head, the channel member being configured to supply the liquid to the head.

The head includes four manifolds each having: a common channel extending in a first direction and connected to a plurality of nozzles; and an inlet connected to an end, in the first direction, of the common channel. The four manifolds include a first manifold, a second manifold, a third manifold and a fourth manifold arranged in an order of the first manifold, the second manifold, the third manifold and the fourth manifold along a second direction orthogonal to the first direction.

The channel member includes: a first member having a supply port being single supply port of the channel member; and a second member facing the first member in the second direction. The channel member is formed with a first supply channel extending between the supply port and the inlet of the first manifold, a second supply channel extending between the supply port and the inlet of the second manifold, a third supply channel extending between the supply port and the inlet of the third manifold, and a fourth supply channel extending between the supply port and the inlet of the fourth manifold.

In a first manifold group including two of the four manifolds, the inlet is connected to the end, on a first side in the first direction, of the common channel, and in a second manifold group including remaining two of the four manifolds, the inlet is connected to the end, on a second side in the first direction, of the common channel.

The first manifold group includes the first manifold and the third manifold and the second manifold group includes the second manifold and the fourth manifold, or the first manifold group includes the first manifold and the fourth manifold and the second manifold group includes the second manifold and the third manifold.

Each of the third supply channel and the fourth supply channel is formed in both the first member and the second member.

According to the head system of the present disclosure, while suppressing an increase in size of the head system, it is possible to supply a liquid to a plurality of manifolds in the head by cross flow.

In FIG. 5, the illustration of an ink guide portion is omitted.

FIRST EMBODIMENT

An explanation will be made about a head unit 100 and a head system HS1 according to a first embodiment of the present disclosure by taking as an example a case where the head unit 100 is used in a printer (printing device) 1000.

[Printer 1000]

Figure 1:
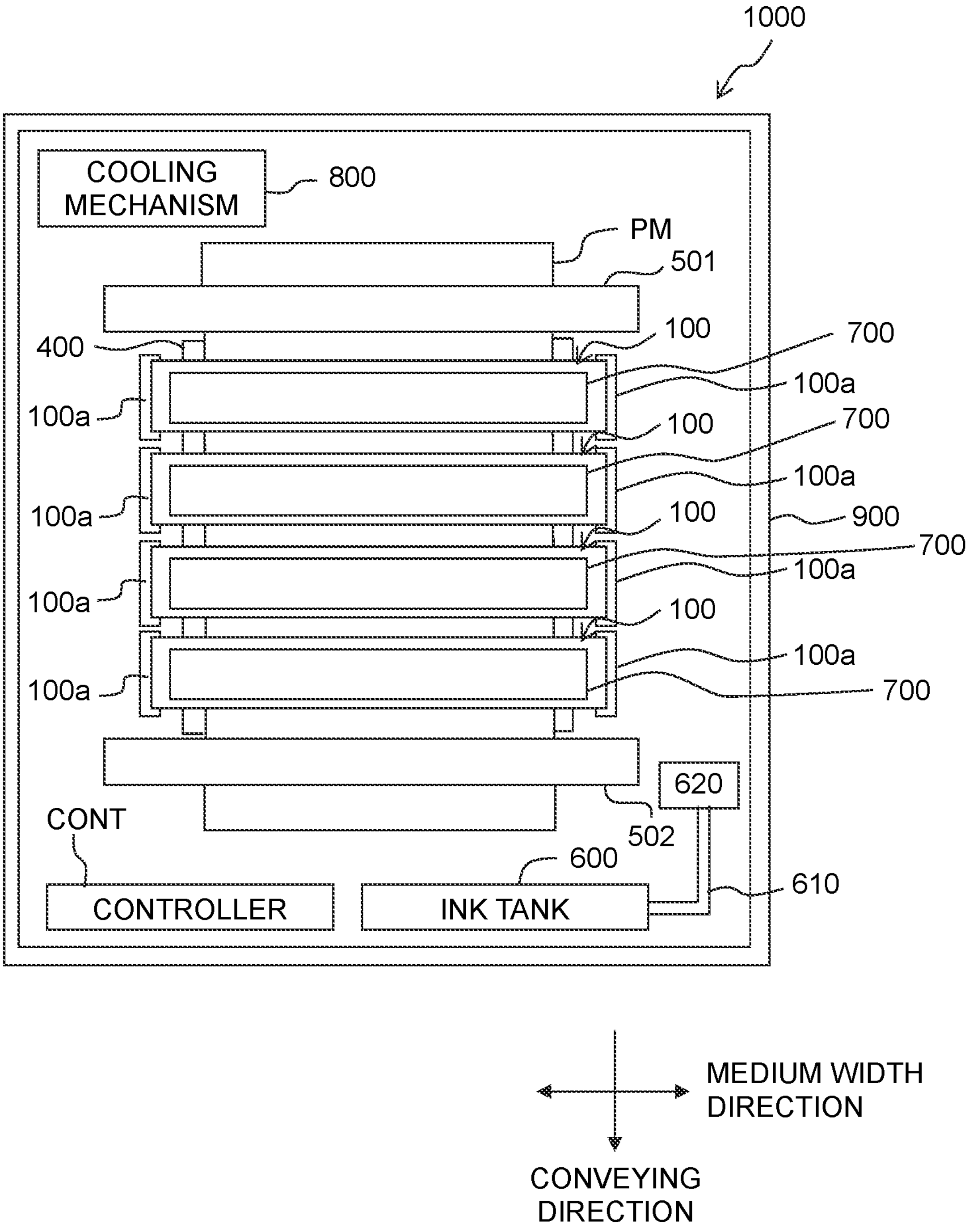
FIG. 1 is a schematic configuration of a printer.

As depicted in FIG. 1, the printer 1000 is mainly provided with the four head units 100, a platen 400, a pair of conveying rollers 501 and 502, a controller CONT, and a housing 900 for accommodating these elements. Further, inside the housing 900, an ink tank 600, four sub-tanks 700, and a cooling mechanism 800 are accommodated.

In the following explanation, a direction in which the pair of conveying rollers 501 and 502 are arranged, that is, a direction in which a medium PM is conveyed when forming an image is called a conveying direction of the printer 1000. As for the conveying direction, an upstream side and a downstream side in the direction in which the medium PM is conveyed are called a supply side and a discharge side in the conveying direction, respectively. The conveying direction is an example of the "second direction" in an aspect of the present invention.

Further, a direction in a horizontal plane orthogonal to the conveying direction, that is, a direction in which rotation shafts of the conveying rollers 501 and 502 extend is called a medium width direction. As for the medium width direction, a left side and a right side when viewed from a discharge side to a supply side in the conveying direction are called a left side and a right side in the medium width direction, respectively. The medium width direction is an example of a "first direction" of an aspect of the present invention. A direction orthogonal to the conveying direction and the medium width direction is called an up and down direction.

Each of the four head units 100 is a so-called line type head, and is supported by a support member **100*a* at both end portions in the medium width direction. In this embodiment, the four head units 100 discharge inks of different colors. The four color inks discharged by the four head units 100 are, for example, cyan ink, magenta ink, yellow ink, and black ink. The specific structure and function of each of the four head units 100** will be described later.

The platen 400 is a plate-shaped member which supports the medium PM from the opposite side (below) of the head unit 100 when ink is discharged from the head unit 100 toward the medium PM. The width of the platen 400 in the medium width direction is larger than the width of the largest medium on which image recording by the printer 1000 is possible.

The pair of conveying rollers 501 and 502 are arranged to sandwich the platen 400 in the conveying direction. The pair of conveying rollers 501 and 502 conveys the medium PM to the discharge side in the conveying direction in a predetermined manner when an image is formed on the medium PM by the head unit 100.

The ink tank 600 is divided into four so that the four color inks are accommodated. The four sub-tanks 700 are provided one by one above the four head units 100.

The four color inks are delivered to a reservoir 620 by a pipe conduit 610. The pipe conduit 610 and the reservoir 620 are divided into four so that four color inks are distributed and accommodated. Each color ink sent to the reservoir 620 is circulated between one of the four sub-tanks 700 and the reservoir 620 through a conduit (not depicted) and a pump (not depicted).

Each of the four sub-tanks 700 supplies ink to the head unit 100 arranged directly below and collects ink from the said head unit 100.

The cooling mechanism 800 is a mechanism which circulates a coolant to cool a control board 82 (described later) provided in the head unit 100. The cooling mechanism 800 mainly has a coolant tank, a pump, a coolant supply pipe, and a coolant collect pipe (none depicted). The cooling mechanism 800 circulates the coolant between the coolant tank and the head unit 100 through the coolant supply pipe and the coolant collect pipe.

The controller CONT controls each part provided in the printer 1000 as a whole and causes an image forming on the medium PM and the like to occur. The controller CONT is provided with FPGA (Field Programmable Gate Array), EEPROM (Electrically Erasable Programmable Read-Only Memory), RAM (Random Access Memory), and the like. Further the controller CONT may be provided with a CPU (Central Processing Unit) or an ASIC (Application Specific Integrated Circuit) or the like. The controller CONT is connected to an external device (not depicted) such as a PC so that data communication is capable, and controls each part of the printer 1000 based on print data sent from the external device.

[Head Unit 100]

Since the four head units 100 have the configuration identical to each other, one of them will be explained below as a representative.

Figure 2:
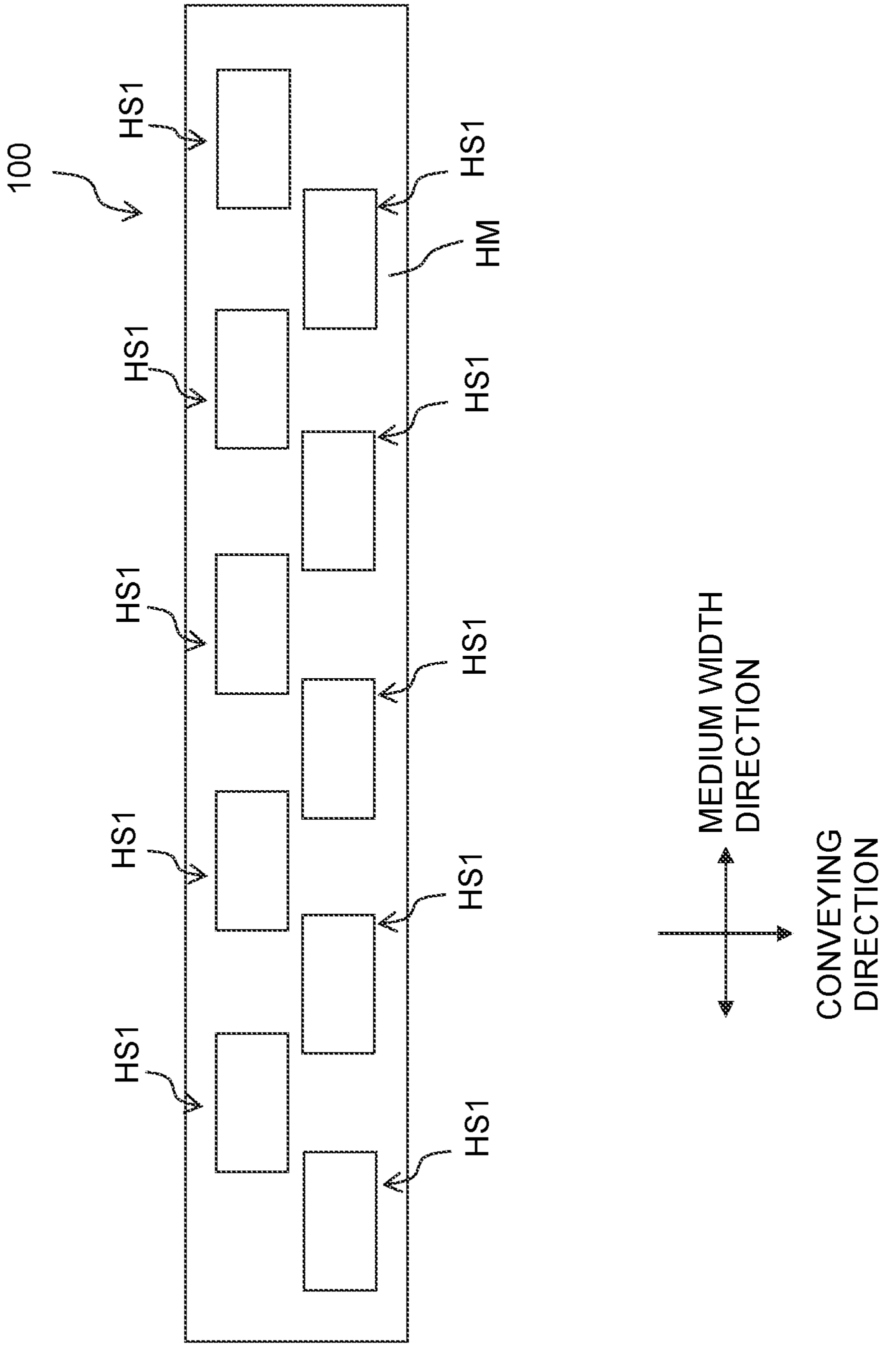
FIG. 2 is a plan view of a head unit.

The head unit 100, as depicted in FIG. 2, is provided with a holding member HM and the ten head systems HS1 integrally supported by the holding member HM.

The holding member HM is a plate-shaped member having a rectangular shape in a plan view in which the medium width direction is a long-side direction and the conveying direction is a short-side direction. Both end portions of the holding member HM in the long-side direction are supported portions supported by the support **100*a***.

The ten head systems HS1 are integrally held by the holding member HM by being arranged inside a plurality of openings (not depicted) of the holding member HM, respectively. The ten head systems HS1 are arranged in a staggered manner (a zigzag pattern) along the medium width direction in a plan view.

[Head System HS1]

Since the ten head systems HS1 have the configuration identical to each other, one of them will be explained as a representative. The following explanation will be made by taking as an example a case where the head system HS1 is provided so that the extending direction of the nozzle array $L_3$ (FIG. 8, detailed description will be later) matches the medium width direction of the printer 1000. However, the installation aspect of the head system HS1 is not limited to this.

Figure 3:
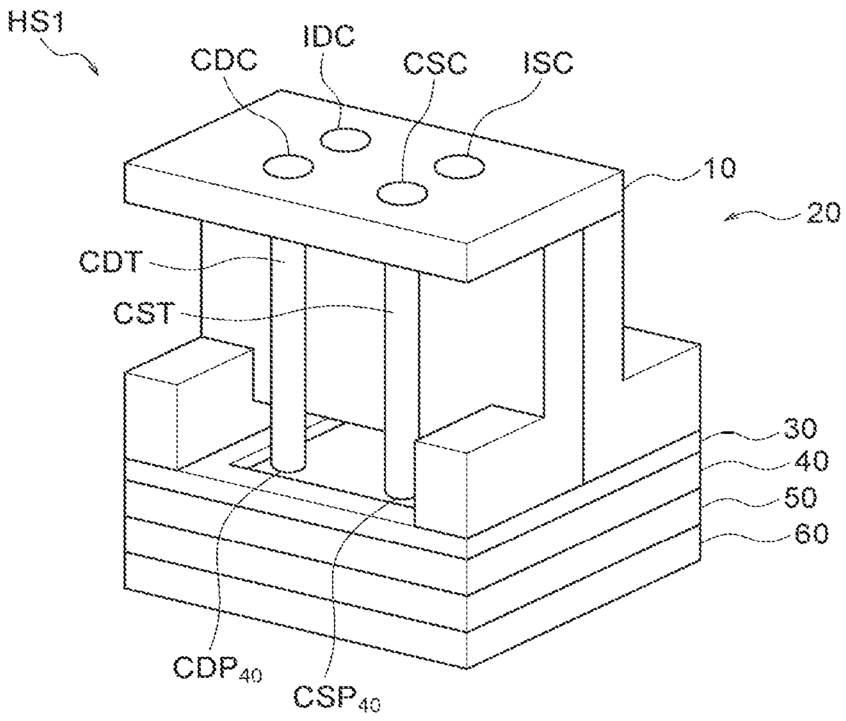
FIG. 3 is a perspective view of a head system.
Figure 7:
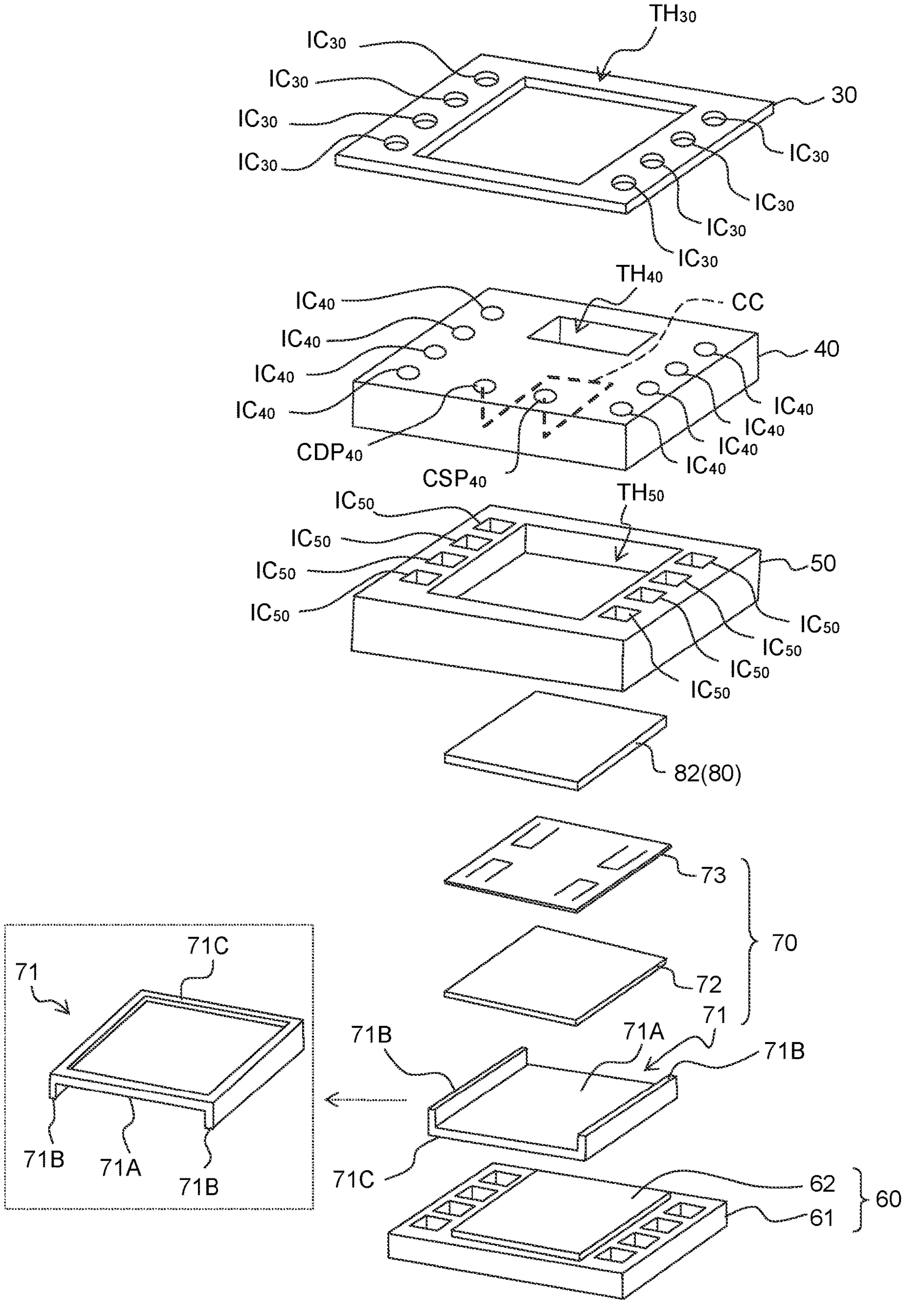
FIG. 7 is an exploded perspective view of the structure of the head system below the channel member.
Figure 10:
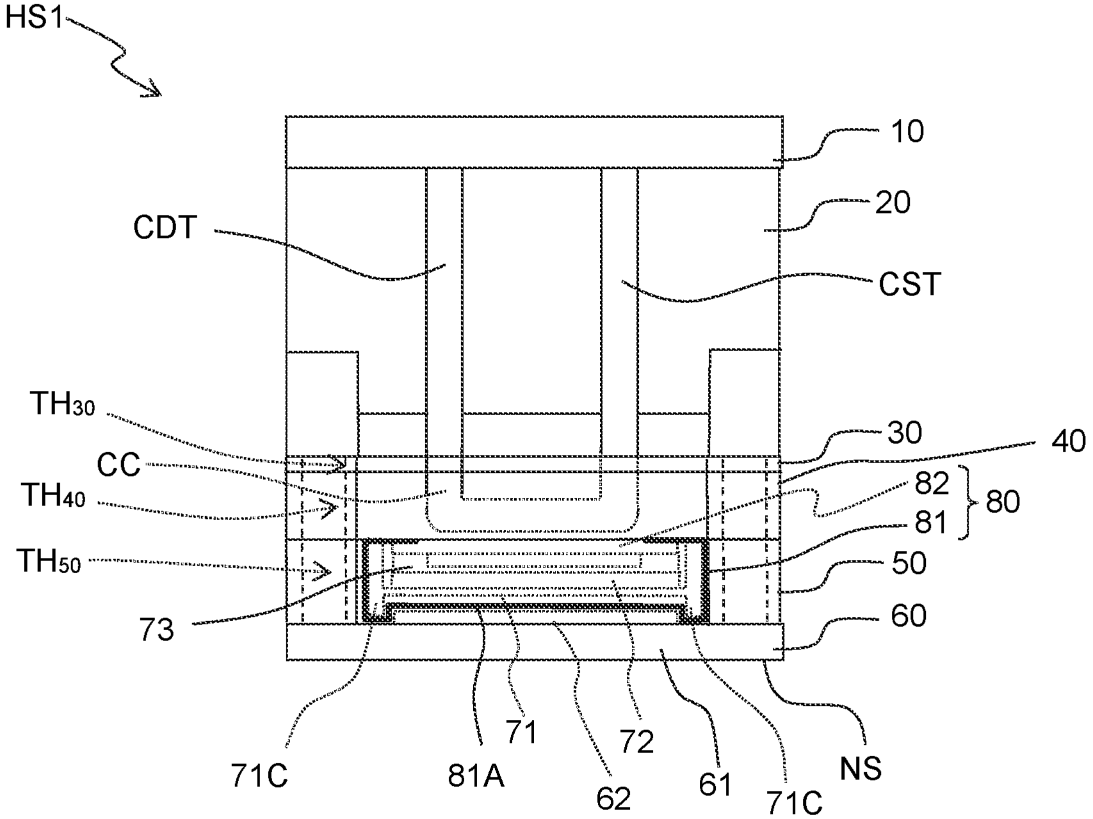
FIG. 10 is a side view of the head system.

As depicted in FIG. 3, the head system HS1 is provided with, in order from the top, a connector 10, a channel member 20, an alignment frame 30, a cooling frame 40, a front end frame 50, and a head 60. As depicted in FIGS. 7 and 10, a head heater mechanism 70 and a discharge control section 80 are provided inside the front end frame 50.

The connector 10 is, for example, a thick plate-shaped member formed of resin. The connector 10 has an ink supply pipe connection port ISC penetrating the connector 10 in the up and down direction, an ink discharge pipe connection port IDC, a coolant supply pipe connection port CSC, and a coolant discharge pipe connection port CDC.

An ink supply pipe and an ink discharge pipe (none depicted) extending from the sub-tank 700 are connected from above to the ink supply pipe connection port ISC and the ink discharge pipe connection port IDC of the connector 10, respectively. A coolant supply pipe and a coolant discharge pipe (none depicted) of the cooling mechanism 800 are connected from above to the coolant supply pipe connection port CSC and the coolant discharge pipe connection port CDC of the connector 10, respectively.

Figure 4:
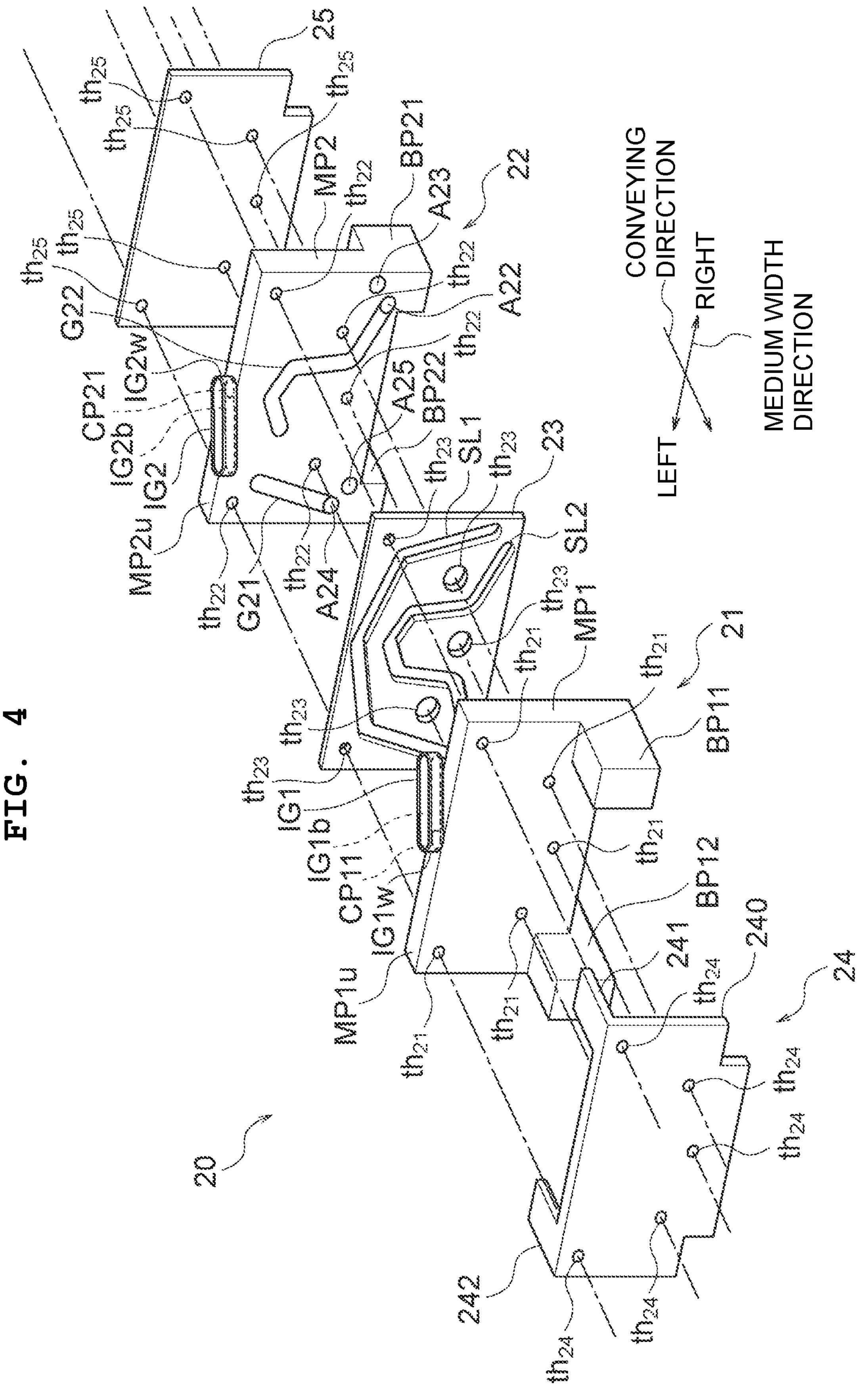
FIG. 4 is an exploded perspective view of a channel member.

As depicted in FIG. 4, the channel member 20 has a first channel member 21, a second channel member 22, a seal member 23, a first pressing plate 24 and a second pressing plate 25.

The first channel member 21 is, for example, a block-shaped member formed of resin such as POM or the like and has a rectangular plate-shaped main portion MP1, a first base portion BP11 which protrudes from a corner portion of the main portion MP 1 at a right side in the medium width direction and a lower side in the up and down direction to the discharge side and a lower side, and a second base portion BP12 which protrudes from a corner portion of the main portion MP1 at a left side in the medium width direction and a lower side in the up and down direction to the discharge side and a lower side of the main portion MP1.

On an upper surface MP1*u* of the main portion MP1, an ink flow port (supply port) CP11 is provided at the central portion in the medium width direction of the first channel member 21. An ink guide portion IG1 is provided, which extends from the ink flow port CP11 to a right side in the medium width direction and to the supply side in the conveying direction. The ink guide portion IG1 has a peripheral wall IG1*w* which is elliptic or oval in a plan view and a bottom portion IG1*b* surrounded by the peripheral wall IG1*w*.

Figure 5:
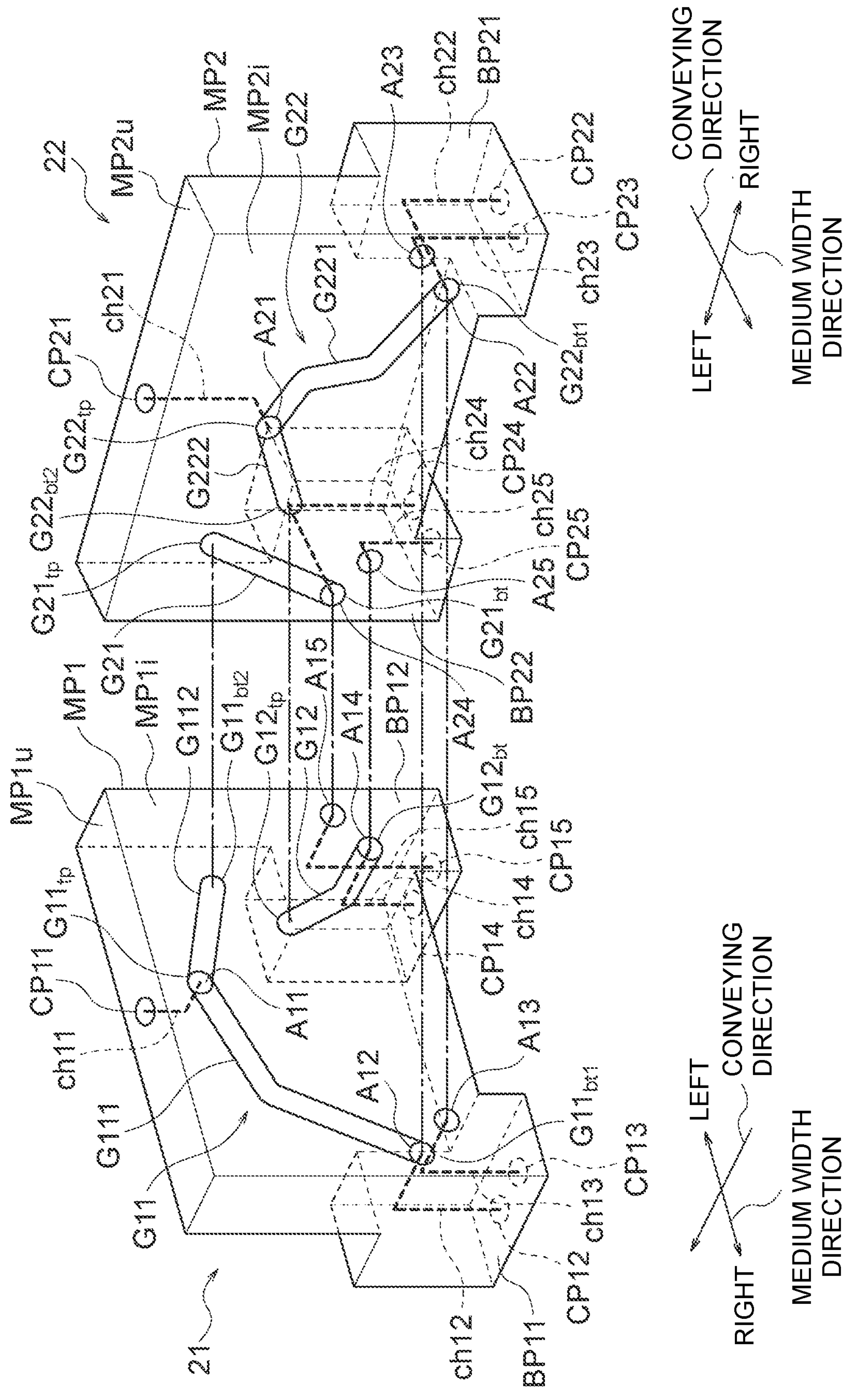
FIG. 5 is a perspective view of a first channel member and a second channel member for explaining channels formed inside the first channel member and the second channel member.

As depicted in FIG. 5, on a lower surface of the first base portion BP11, ink flow ports CP12 and CP13 are formed side by side in the conveying direction. The ink flow port CP12 is positioned on the discharge side and the ink flow port CP13 is positioned on the supply side. On a lower surface of the second base portion BP12, ink flow ports CP14 and CP15 are formed side by side in the conveying direction. The ink flow port CP14 is positioned on the discharge side and the ink flow port CP15 is positioned on the supply side.

On an inner surface MP1*i* (surface facing the supply side in the conveying direction) of the main portion MP1, a first recessed groove G11 and a second recessed groove G12 are formed.

The first recessed groove G11 includes a first portion G111 which extends from a top portion $\mathbf{G11}_{tp}$ downwardly to a right side in the medium width direction to reach a lower end portion $\mathbf{G11}_{bt1}$, and a second portion G112 which extends from the top portion $\mathbf{G11}_{tp}$ downwardly to a left side in the medium width direction to reach a lower end portion $\mathbf{G21}_{bt2}$.

The top portion $\mathbf{G11}_{tp}$ is positioned at the central portion of the inner surface MP1*i* in the medium width direction. The lower end portion $\mathbf{G11}_{bt1}$ is positioned in the vicinity of a right end of the inner surface MP1*i*. The lower end portion $\mathbf{G11}_{bt2}$ is positioned on a left side of the center of the inner surface MP1*i* in the medium width direction. When viewed in the conveying direction, the lower end portion $\mathbf{G11}_{bt1}$ is positioned in the area in which the first base portion BP11 is provided.

The extending directions of the first portion G111 and the second portion G112 are inclined by predetermined angles with respect to the up and down direction (vertical direction). The first portion G111 is bent once on a path from the top portion $\mathbf{G11}_{tp}$ to reach the lower end portion $\mathbf{G11}_{bt1}$. By inclining the extending direction of the channel with respect to the horizontal direction, it is possible to suppress the precipitation of the pigment onto a channel bottom surface and as a result, it is possible to prevent clogging of the channel, which may occur due to the pigment that has settled on the channel bottom surface flowing all at once. In addition, it is possible to suppress air bubbles mixed in the ink from remaining on an upper surface of the channel, and it is possible to flow the air bubbles upwardly more reliably. The inclination angles of the first portion G111 and the second portion G112 with respect to the vertical axis extending downwardly from the top portion $\mathbf{G11}_{tp}$ may be set to an arbitrary angle of 90° or less. Also, it is possible to adjust the channel length by changing the number of bends on the path.

The second recessed groove G12 is formed below the first recessed groove G11. The second recessed groove G12 extends from a top portion $\mathbf{G12}_{tp}$ downwardly to a left side in the medium width direction to reach a lower end portion $\mathbf{G12}_{bt}$. The extending direction of the second recessed groove G12 is inclined by a predetermined angle with respect to the up and down direction (vertical direction). The second recessed groove G12 is bent once on a path from the top portion $\mathbf{G12}_{tp}$ to the lower end portion $\mathbf{G12}_{bt}$.

The top portion $\mathbf{Gl2}_{tp}$ is positioned on the left side of the center of the inner surface MP1*i* in the medium width direction. The lower end portion $\mathbf{G12}_{bt}$ is positioned in the vicinity of the left end of the inner surface MP1*i*. When viewed in the conveying direction, the lower end portion $\mathbf{G12}_{bt}$ is positioned in the area in which the second base portion BP12 is provided.

At the top portion $\mathbf{G11}_{tp}$ of the first recessed groove G11, an opening A11 is provided, and at the lower end portion $\mathbf{G11}_{bt1}$ of the first recessed groove G11, an opening A12 is provided. At the lower end portion $\mathbf{G12}_{bt}$ of the second recessed groove G12, an opening A14 is provided. At the lower left of the opening A12, an opening A13 is provided, and at the upper left of the opening A14, an opening A15 is provided.

Inside the main portion MP1, a channel ch11 extending in the up and down direction is formed at a position which overlaps with the top portion $\mathbf{G11}_{tp}$ of the first recessed groove G11 in the medium width direction. A lower end portion of the channel ch11 communicates with the first recessed groove G11 through the opening A11, and an upper end portion of the channel ch11 communicates with the ink flow port CP11.

Inside the main portion MP1 and the first base portion BP11, a channel ch12 connecting the lower end portion $\mathbf{G11}_{bt1}$ of the first recessed groove G11 and the ink flow port CP12, and a channel ch13 connecting the opening A13 and the ink flow port CP13 are formed.

An upper end portion of the channel ch12 communicates with the first recessed groove G11 through the opening A12. The channel ch12, after extending from the upper end portion to the discharge side in the conveying direction, bends downwardly to reach the ink flow port CP12. The channel ch13, after extending from the opening A13 to the discharge side in the conveying direction, bends downwardly to reach the ink flow port CP13. As depicted in FIG. 5, a channel length of an area extending horizontally along the conveying direction is longer in the channel ch12 than in the channel ch13.

Inside the main portion MP1 and the second base portion BP12, a channel ch14 connecting the lower end portion $\mathbf{G12}_{bt}$ of the second recessed groove G12 and the ink flow port CP14, and a channel ch15 connecting the opening A15 and the ink flow port CP15 are formed.

An upper end portion of the channel ch14 communicates with the second recessed groove G12 through the opening A14. The channel ch14 after extending from the upper end portion to the discharge side in the conveying direction, bends downwardly to reach the ink flow port CP14. The channel ch15 after extending from the opening A15 to the discharge side in the conveying direction, bends downwardly and passes by the channel ch14 to reach the ink flow port CP15. As depicted in FIG. 5, a channel length of an area extending horizontally along the conveying direction is longer in the channel ch14 than the channel ch15. Further, channel lengths of areas horizontally extending along the conveying direction in the channel ch12 and in the channel ch14 are equal to each other, and channel lengths of areas horizontally extending along the conveying direction in the channel ch13 and in the channel ch15 are equal to each other.

The second channel member 22 faces the first channel member 21 in the conveying direction. The second channel member 22 is a block-shaped member formed of, for example, resin such as POM or the like and has a rectangular plate-shaped main portion MP2, a first base portion BP21 which protrudes from a corner of the main portion MP2 at a right side in the medium width direction and a lower side in the up and down direction to the supply side and a lower side, and a second base portion BP22 which protrudes from a corner of the main portion MP2 at a left side in the medium width direction and a lower side in the up and down direction to the supply side and to a lower side.

On an upper surface MP2*u* of the main portion MP2, an ink flow port (discharge port) CP21 is provided at the central portion of the second channel member 22 in the medium width direction. An ink guide portion IG2 is provided, which extends from the ink flow port CP21 to a left side in the medium width direction and to the discharge side in the conveying direction. The ink guide portion IG2 has a peripheral wall IG2*w* which is elliptic or oval in a plan view and a bottom portion IG2*b* surrounded by the peripheral wall IG2*w*.

On a lower surface of the first base portion BP21, ink flow ports CP22 and CP23 are formed side by side in the conveying direction. The ink flow port CP22 is positioned on the supply side, and the ink flow port CP23 is positioned on the discharge side. On a lower surface of the second base portion BP22, ink flow ports CP24 and CP25 are formed side by side in the conveying direction. The ink flow port CP24 is positioned on the supply side, and the ink flow port CP25 is positioned on the discharge side.

On an inner surface MP2*i* (surface facing the discharge side in the conveying direction) of the main portion MP2, a first recessed groove G21 and a second recessed groove G22 are formed.

The first recessed groove G21 is linear and extends from a top portion G21$_{tp}$ downwardly to a left side in the medium width direction to reach a lower end portion G21$_{bt}$. The extending direction of the first recessed groove G21 is inclined by a predetermined angle with respect to the up and down direction (vertical direction).

The top portion G21$_{tp}$ is positioned on the left side of the central portion of the inner surface MP2*i* in the medium width direction. The lower end portion G21$_{bt}$ is positioned in the vicinity of a left end of the inner surface MP2*i*. When viewed in the conveying direction, the lower end portion G21$_{bt}$ is positioned in the area in which the second base portion BP22 is provided.

The second recessed groove G22 is formed on the right side of the first recessed groove G21. The second recessed groove G22 includes a first portion G221 which extends from a top portion G22$_{tp}$ downwardly to a right side in the medium width direction to reach a lower end portion G22$_{bt1}$, and a second portion G222 which extends from the top portion G22$_{tp}$ downwardly to a left side in the medium width direction to reach a lower end portion G22$_{bt2}$. The extending directions of the first portion G221 and the second portion G222 are inclined by predetermined angles with respect to the up and down direction (vertical direction). The first portion G221 is bent twice on a path from the top portion G22$_{tp}$ to the lower end portion G22$_{bt1}$.

The top portion G22$_{tp}$ is positioned at the central portion of the inner surface MP2*i* in the medium width direction. The lower end portion G22$_{bt1}$ is positioned in the vicinity of a right end of the inner surface MP2*i*. The lower end portion G22$_{bt2}$ is positioned on the left side of the center of the inner surface MP2*i* in the medium width direction. When viewed in the conveying direction, the lower end portion G22$_{bt1}$ is positioned in the area in which the first base portion BP21 is provided.

At the lower end portion G21$_{bt}$ of the first recessed groove G21, an opening A24 is provided. At the top portion G22$_{tp}$ of the second recessed groove G22, an opening A21 is provided, and at the lower end portion G22$_{bt1}$ of the second recessed groove G22, an opening A22 is provided. At the lower right of the opening A24, an opening A25 is provided, and at the upper right of the opening A22, an opening A23 is provided.

Inside the main portion MP2, a channel ch21 extending in the up and down direction is formed at a position which overlaps with the top portion G22$_{tp}$ of the second recessed groove G22 in the medium width direction. A lower end portion of the channel ch21 communicates with the second recessed groove G22 through the opening A21 formed in the top portion G22$_{tp}$, and an upper end portion of the channel ch21 communicates with the ink flow port CP21.

Inside the main portion MP2 and the first base portion BP21, a channel ch22 connecting the lower end portion G22$_{bt1}$ of the second recessed groove G22 and the ink flow port CP22, and a channel ch23 connecting the opening A23 and the ink flow port CP23 are formed.

An upper end portion of the channel ch22 communicates with the second recessed groove G22 through the opening A22. The channel ch22, after extending from the upper end portion to the supply side in the conveying direction, bends downwardly to reach the ink flow port CP22. The channel ch23, after extending from the opening A23 to the supply side in the conveying direction, bends downwardly and passes by the channel ch22 to reach the ink flow port CP23. As depicted in FIG. 5, a channel length of an area extending horizontally along the conveying direction is longer in the channel ch22 than in the channel ch23.

Inside the main portion MP2 and the second base portion BP22, a channel ch24 connecting the lower end portion G21$_{bt}$ of the first recessed groove G21 and the ink flow port CP24, and a channel ch25 connecting the opening A25 and the ink flow port CP25 are formed.

An upper end portion of the channel ch24 communicates with the first recessed groove G21 through the opening A24. The channel ch24, after extending from the upper end portion to the supply side in the conveying direction, bends downwardly to reach the ink flow port CP24. The channel ch25, after extending from the opening A25 to the supply side in the conveying direction, bends downwardly to reach the ink flow port CP25. As depicted in FIG. 5, as for the channel length of an area extending horizontally along the conveying direction, the channel length in the channel ch24 is longer than the channel length in the channel ch25. Further, channel lengths of areas horizontally extending along the conveying direction in the channel ch22 and in the channel ch24 are equal to each other, and channel lengths of areas horizontally extending along the conveying direction in the channel ch23 and in the channel ch25 are equal to each other.

The rubber sheet 23 (an example of the "seal" of an aspect of the present invention) is arranged between the first channel member 21 and the second channel member 22 to prevent ink from leaking from a channel configured by the first channel member 21 and the second channel member 22. The rubber sheet 23 may be an elastic member formed of EPDM, silicone, or the like.

Figure 6:
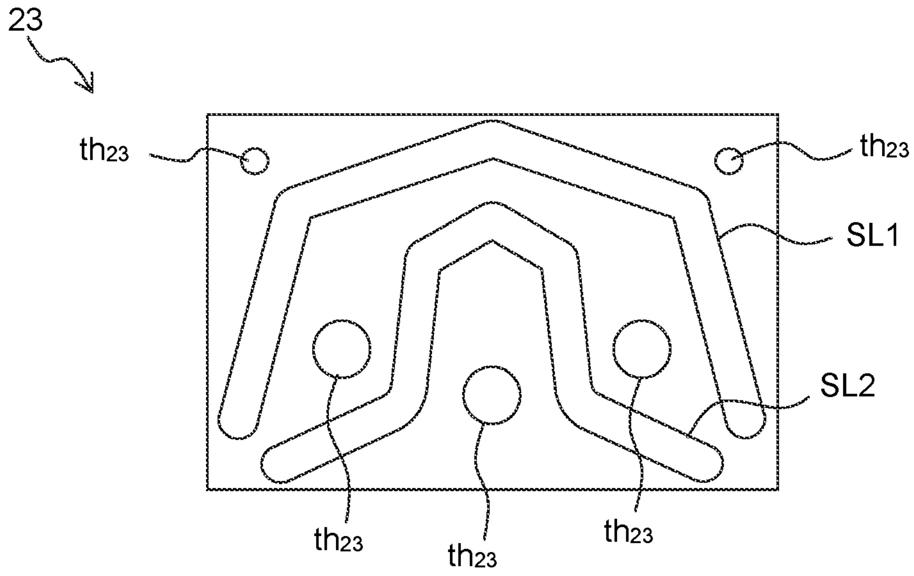
FIG. 6 is a plan view of a rubber sheet.

As depicted in FIG. 6, the rubber sheet 23 is provided with slits SL1 and SL2 penetrating in the thickness direction. The slits SL1 and SL2 each have an upwardly convex shape, and the slit SL2 is provided below the slit SL1. The slit SL1 has a shape extending over the entire area of a channel (details will be described later) configured by the first recessed groove G11 of the first channel member 21 and the first recessed groove G21 of the second channel member 22. The slit SL2 has a shape extending over the entire area of a channel (details will be described later) configured by the second recessed groove G12 of the first channel member 21 and the second recessed groove G22 of the second channel member 22.

A first pressing plate 24 (an example of the "first metal plate" of an aspect of the present invention) and a second pressing plate 25 (an example of the "second metal plate" of an aspect of the present invention) are members for holding the first channel member 21 and the second channel member 22 by making the first channel member 21 and the second channel member 22 in close contact with the rubber sheet 23. The first pressing plate 24 and the second pressing plate 25 are formed of metal (for example, iron such as S45C).

The first pressing plate 24 has a plate-shaped main portion 240, a plate-shaped first convex portion 241 which protrudes from an upper right corner portion of the main portion 240 to the supply side in the conveying direction, and a plate-shaped second convex portion 242 which protrudes from an upper left corner portion of the main portion 240 to the supply side in the conveying direction.

In the channel member 20, as depicted in FIG. 4, in a state in which the first channel member 21 and the second channel member 22 sandwich the rubber sheet 23, and the first pressing plate 24 and the second pressing plate 25 sandwich the first channel member 21 and the second channel member 22, they are fixed by screws. The screw fixing is performed by inserting five screws (not depicted) through five through-holes film provided in the first channel member 21, five through-holes th22 provided in the second channel member 22, five through-holes th23 provided in the rubber sheet 23, five through holes th24 provided in the first pressing plate 24, and five through holes th25 provided in the second pressing plate 25.

In this state, the first pressing plate 24 and the second pressing plate 25 are fixed to each other by screws. Further, the first pressing plate 24 presses the first channel member 21 against the second channel member 22, and the second pressing plate 25 presses the second channel member 22 against the first channel member 21. As a result, the first channel member 21 and the second channel member 22 are brought into press contact with the rubber sheet 23.

In this way, by sandwiching the first channel member 21 and the second channel member 22 by the plane-shaped first pressing plate 24 and the second pressing plate 25, the inner surface MP1*i* of the first channel member 21 and the inner surface MP2*i* of the second channel member 22 are uniformly pressed against the rubber sheet 23 in the in-plane direction. Therefore, leakage of ink from the channel member 20 may be suppressed more satisfactorily. Moreover, since screw fixing is used, the first pressing plate 24 and the second pressing plate 25 may be repeatedly installed and removed.

The first recessed groove G11 of the first channel member 21 is closed (covered) by the inner surface MP2*i* of the main portion MP2 of the second channel member 22 through the slit SL1 of the rubber sheet 23. Further, the second recessed groove G12 of the first channel member 21 is closed (covered) by the inner surface MP2*i* of the main portion MP2 of the second channel member 22 through the slit SL2 of the rubber sheet 23.

Similarly, the first recessed groove G21 of the second channel member 22 is closed (covered) by the inner surface MP1*i* of the main portion MP1 of the first channel member 21 through the slit SL1 of the rubber sheet 23. Also, the second recessed groove G22 of the second channel member 22 is closed (covered) by the inner surface MP1*i* of the main portion MP1 of the first channel member 21 through the slit SL2 of the rubber sheet 23.

The lower end portion $G11_{bt1}$ of the first recessed groove G11 of the first channel member 21 overlaps the opening A23 of the second channel member 22 when viewed in the conveying direction. That is, the lower end portion $G11_{bt1}$ of the first recessed groove G11 of the first channel member 21 communicates with the opening A23 of the second channel member 22 through the slit SL1 of the rubber sheet 23.

The lower end portion $G11_{bt2}$ of the first recessed groove G11 of the first channel member 21 overlaps the top portion $G22_{tp}$ of the first recessed groove G21 of the second channel member 22 when viewed in the conveying direction. That is, the lower end portion $G11_{bt2}$ of the first groove G11 of the first channel member 21 communicates with the top portion $G21_{tp}$ of the first recessed groove G21 of the second channel member 22 through the slit SL1 of the rubber sheet 23.

An upper end portion $G12_{tp}$ of the second recessed groove G12 of the first channel member 21 overlaps the lower end portion $G22_{bt2}$ of the second recessed groove G22 of the second channel member 22 when viewed in the conveying direction. That is, the upper end portion $G12_{tp}$ of the second recessed groove G12 of the first channel member 21 communicates with the lower end portion $G22_{bt2}$ of the second recessed groove G22 of the second channel member 22 through the slit SL2 of the rubber sheet 23.

The lower end portion $Gl2_{bt}$ of the second recessed groove G12 of the first channel member 21 overlaps the opening A25 of the second channel member 22 when viewed in the conveying direction. That is, the lower end portion $G12_{bt}$ of the second recessed groove G12 of the first channel member 21 communicates with the opening A25 of the second channel member 22 through the slit SL2 of the rubber sheet 23.

The opening A13 of the first channel member 21 overlaps the lower end portion $G22_{bt1}$ of the second recessed groove G22 of the second channel member 22 when viewed in the conveying direction. That is, the opening A13 of the first channel member 21 communicates with the lower end portion $G22_{bt1}$ of the second recessed groove G22 of the second channel member 22 through the slit SL2 of the rubber sheet 23.

The opening A15 of the first channel member 21 overlaps the lower end portion $G21_{bt}$ of the first recessed groove G21 of the second channel member 22 when viewed in the conveying direction. That is, the opening A15 of the first channel member 21 communicates with the lower end portion $G21_{bt}$ of the first recessed groove G21 of the second channel member 22 through the slit SL1 of the rubber sheet 23.

The channel member 20 is fixed to a lower surface of the connector 10 by screwing the connector 10 to the first convex portion 241 and the second convex portion 242 of the first pressing plate 24. An end portion opposite to the ink flow port CP11 of the ink guide portion IG1 of the first channel member 21 is positioned directly below the ink supply pipe connection port ISC of the connector 10. An end portion opposite to the ink flow port CP21 of the ink guide portion IG2 of the second channel member 22 is positioned directly below the ink discharge pipe connection port IDC of the connector 10.

The alignment frame 30 is, for example, a flat plate member made of SUS. As depicted in FIG. 7, the alignment frame 30 has a central through-hole $TH_{30}$ which is rectangular in a plan view and penetrates up and down through the central portion of the alignment frame 30, and eight ink channels $IC_{30}$ which are circular in a plan view and provided around the central through-hole $TH_{30}$.

The alignment frame 30 is fixed to a lower surface of the channel member 20. In this state, the ink flow ports CP12 to CP15 and CP22 to CP25 on the lower surface of the channel member 20 communicate with the ink channels $IC_{30}$ of the alignment frame 30.

The cooling frame 40, as an example, may be formed of a material with high thermal conductivity such as aluminum or the like. As depicted in FIG. 7, the cooling frame 40 is a thick plate-shaped member which is rectangular in a plan view.

Inside the cooling frame 40, a substantially U-shaped coolant channel CC in a plan view is formed. The coolant channel CC extends in a substantially U-shape in a plan view between a coolant supply port $CSP_{40}$ and a coolant discharge port $CDP_{40}$ on an upper surface of the cooling frame 40. Around the coolant channel CC, eight ink channels $IC_{40}$ which are circular in a plan view and a central through-hole $TH_{40}$ are provided.

The cooling frame 40 is fixed to a lower surface of the alignment frame 30. In this state, the eight ink channels $IC_{30}$ of the alignment frame 30 communicates with the eight ink channels $IC_{40}$ of the cooling frame 40, respectively.

As depicted in FIG. 3, a coolant supply pipe CST and a coolant discharge pipe CDT are provided between the connector 10 and the cooling frame 40. Upper and lower ends of the coolant supply pipe CST are connected to the coolant supply pipe connection port CSC of the connector 10 and the coolant supply port $CSP_{40}$ of the cooling frame 40, respectively. Upper and lower ends of the coolant discharge pipe CDT are connected to the coolant discharge pipe connection port CDC of the connector 10 and the coolant discharge port $CDP_{40}$ of the cooling frame 40, respectively.

The front end frame 50 is, for example, a flat plate member made of SUS. The front end frame 50 has a central through-hole $TH_{50}$ which penetrates up and down through the central portion of the front end frame 50 and which is rectangular in a plan view, and eight ink channels $IC_{50}$ which are provided around the central through-hole $TH_{50}$ and which are substantially rectangular in a plan view.

The front end frame 50 is fixed to a lower surface of the cooling frame 40. In this state, each of the eight ink channels $IC_{50}$ communicates with each of the eight ink channels $IC_{40}$ of the cooling frame 40.

Figure 8:
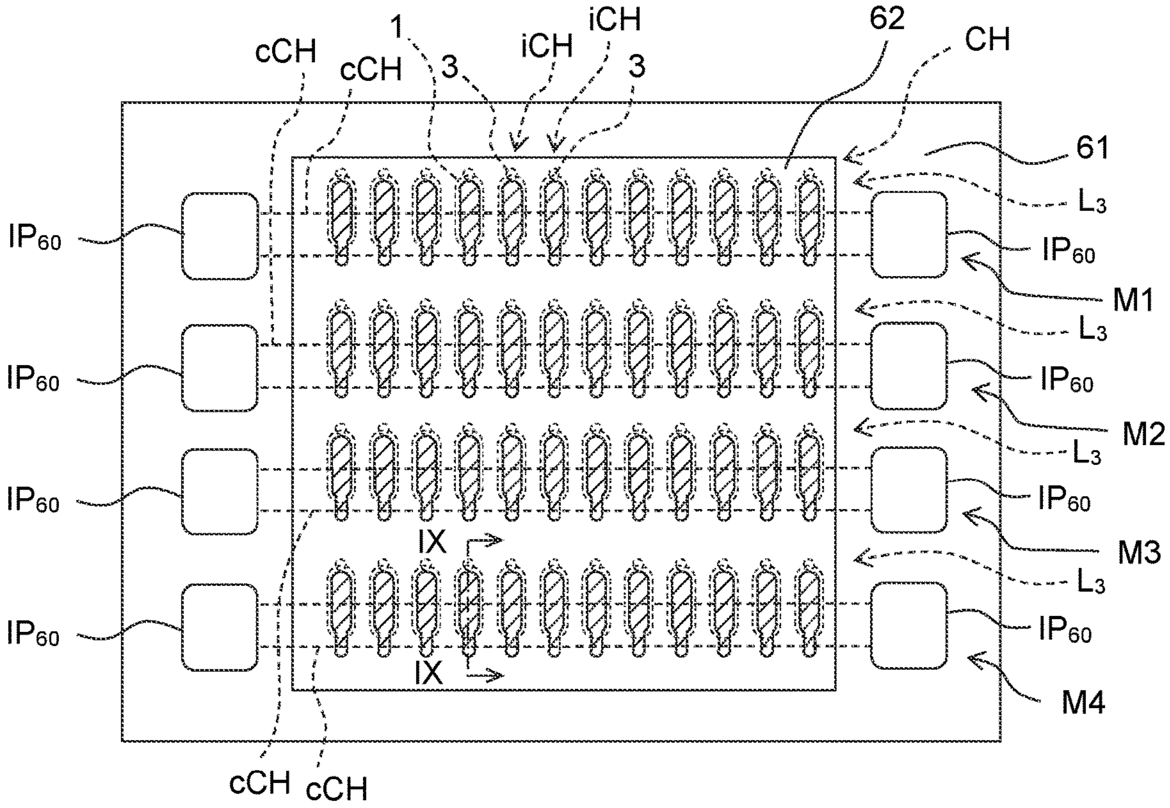
FIG. 8 is a plan view of a head.
Figure 9:
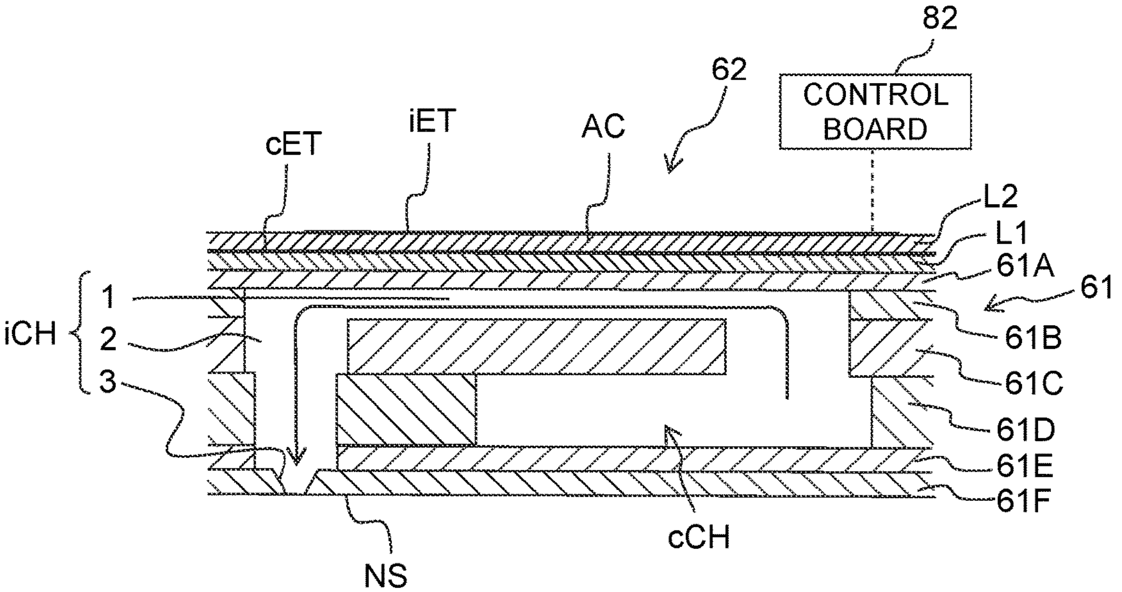
FIG. 9 is a sectional view taken along a line IX-IX in FIG. 8.

The head 60 is provided with a channel unit 61 and a piezoelectric actuator 62 (FIGS. 7, 8 and 9).

As depicted in FIG. 9, the channel unit 61 is a laminated structure in which an ink sealing film 61A, plates 61B to 61E, and a nozzle plate 61F are laminated in this order from the top. As depicted in FIG. 8, inside the channel unit 61, a channel CH is formed.

The channel CH includes four manifold channels M1, M2, M3, and M4 and 48 individual channels iCH. Each of the four manifold channels M1 to M4 includes a linear common channel cCH and ink supply ports $IP_{60}$ (inlet, outlet) at both end portions of the common channel cCH. Twelve individual channels iCH are connected to each of the four manifold channels M1 to M4.

Each of the individual channels iCH, as depicted in FIG. 9, includes a pressure chamber 1, a descender channel 2, and a nozzle 3. An upper surface of the pressure chamber 1 is formed by an ink sealing film 61A. The descender channel 2 extends in the up and down direction from the pressure chamber 1 toward the nozzle 3. The nozzles 3 are minute openings which discharge (eject) ink toward the medium PM, and are formed in the nozzle plate 61F. A lower surface of the nozzle plate 61F is a lower surface of the head system HS1 and a nozzle surface NS. A nozzle array $L_3$ (FIG. 8) is formed on the nozzle surface NS along the direction in which the manifold channels M1 to M4 extend.

The piezoelectric actuator 62, as depicted in FIG. 9, is configured by a first piezoelectric layer L1 provided on an upper surface of the channel unit 61, a second piezoelectric layer L2 above the first piezoelectric layer L1, a common electrode cET sandwiched between the first piezoelectric layer L1 and the second piezoelectric layer L2, and a plurality of individual electrodes iET provided on an upper surface of the second piezoelectric layer L2. The plurality of individual electrodes iET are provided on the upper surface of the second piezoelectric layer L2 so that each is positioned above the pressure chamber 1 of one of the plurality of individual channels iCH. In the second piezoelectric layer L2, a portion sandwiched between the common electrode cET and each of the plurality of individual electrodes iET is an active portion AC polarized in the thickness direction.

A head heater mechanism 70 (an example of the "heater" of an aspect of the present invention) applies heat to the head 60 to heat ink flowing through the head 60. As depicted in FIGS. 7 and 10, the head heater mechanism 70 has a heat transfer member 71, a film heater 72 and a leaf spring 73.

The heat transfer member 71 is formed of a metal with high thermal conductivity, for example, such as aluminum. As depicted in FIG. 7 (the surrounded figure in FIG. 7 depicts a bottom perspective view of the heat transfer member 71) and FIG. 10, the heat transfer member 71 has a plate portion 71A which is substantially square in a plan view, a pair of wall portions 71B which protrude upwardly from both end portions of an upper surface of the plate portion 71A, and a frame-shaped convex portion 71C which protrudes downwardly from an outer edge of a lower surface of the plate portion 71A.

The heat transfer member 71 is attached to the upper surface of the head 60 so that the lower end portion of the frame-shaped convex portion 71C contacts the channel unit 61 around (outside) the piezoelectric actuator 62. A flexible printed circuit board 81 of the discharge control section 80 is partly sandwiched between the frame-shaped convex portion 71C and the channel unit 61 (described later).

The film heater 72 is arranged on the heat transfer member 71 so that its heat generating surface contacts an upper surface of the plate portion 71A of the heat transfer member 71. The heat generated by the film heater 72 is applied to the channel unit 61 through the heat transfer member 71.

The leaf spring 73 is arranged on the upper surface of the film heater 72.

As depicted in FIGS. 7 and 10, the discharge control section 80 is provided with an FPC (Flexible Printed Circuits) 81 and a control board 82 on which a driver IC is mounted. In FIG. 7, illustration of the FPC 81 is omitted.

The FPC 81 is a strip-shaped, and a plurality of contacts (not depicted) are formed in a central portion 81A in the longitudinal direction.

The control board 82 is arranged above the leaf spring 73 of the head heater mechanism 70 in parallel with the plate portion 71A of the heat transfer member 71. The control board 82 is separated from the film heater 72 by the leaf spring 73 and is contacted with the cooling frame 40. Also, the radiant heat of the film heater 72 is blocked by the leaf spring 73, and the heating of the control board 82 is suppressed.

As depicted in FIG. 10, the FPC 81 is arranged on an upper surface of the piezoelectric actuator 62 so that each of the plurality of contacts of the central portion 81A is electrically connected to each of the plurality of individual electrodes iET of the piezoelectric actuator 62. An outer portion of the central portion 81A of the FPC 81 passes between the heat transfer member 71 of the head heater mechanism 70 and the head 60, extends upwardly along a side surface of the heat transfer member 71, and is connected to the control board 82. Thereby, each of the plurality of individual electrodes iET of the piezoelectric actuator 62 is connected to the control board 82 through the FPC 81.

The head 60 is fixed to the front end frame 50. In this state, the eight ink supply ports $IP_{60}$ communicates with the eight ink channels $IC_{50}$ of the front end frame 50, respectively. The piezoelectric actuator 62, the head heater mechanism 70 and the discharge control section 80 are arranged inside the central through hole $TH_{50}$ of the front end frame 50.

The head system HS1 is, for example, fixed to the holding member HM through the alignment frame 30. The control board 82 of the discharge control section 80 is connected to the control section CONT by wiring not depicted.

[Channel Configuration in Head System HS1]

Figure 11:
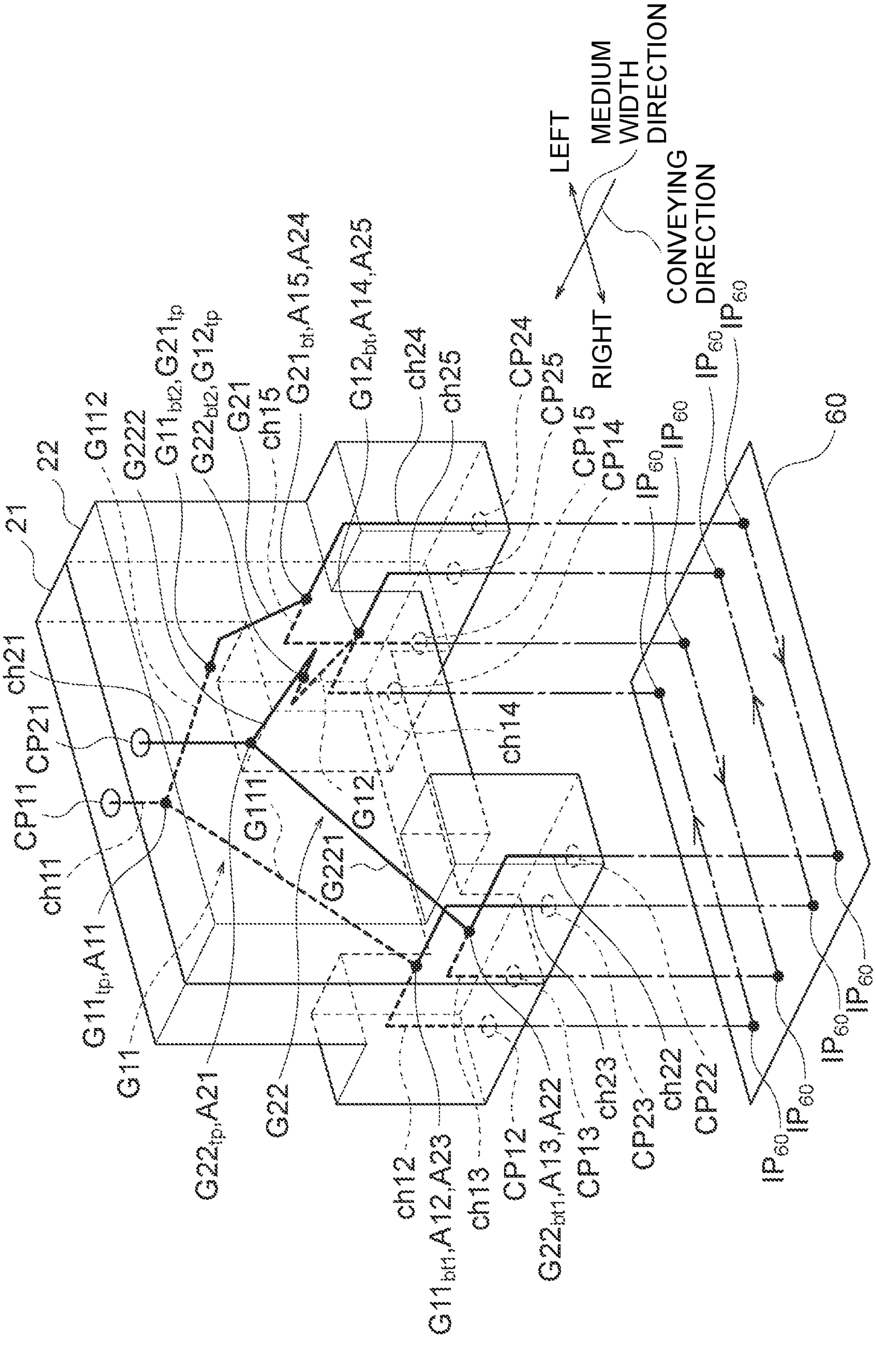
FIG. 11 is an explanatory diagram explaining the channels in the head system.

With reference to FIG. 11, the configuration of the channels formed inside the head system HS1 will be organized. In FIG. 11, a channel formed inside the first channel member 21 is indicated by a broken line, a channel formed inside the second channel member 22 is indicated by a solid line, and a channel formed outside the first channel member 21 and the second channel member 22 is indicated by a dashed line.

The ink flow port CP11 functions as the only (sole) ink supply port that the channel member 20 has, and is an example of the "single supply port" of an aspect of the present invention.

A branch channel extending from the ink flow port CP11 to the lower end portions G11$_{bt1}$ and G21$_{bt}$ is configured by the channel ch11 and the first recessed groove G11 of the first channel member 21, and the first recessed groove G21 of the second channel member 22. Said branch channel is an example of the "main supply channel" of an aspect of the present invention. A channel between the ink flow port CP11 and the lower end portion G11$_{bt1}$ and a channel between the ink flow port CP11 and the lower end portion G21$_{bt}$ are examples of the "first main supply channel" and the "second main supply channel" of an aspect of the present invention, respectively.

A channel extending from the ink flow port CP11 to the lower end portion G11$_{bt1}$ provided in the first channel member 21 through the channel ch11 and the first portion G111 is divided into a channel (an example of the "first branched supply channel" of an aspect of the present invention) extending through the opening A12 of the first channel member 21, the channel ch12, the ink flow port CP12, and the ink channels $IC_{30}$, $IC_{40}$, and $IC_{50}$, to the ink flow port $IP_{60}$ on a right side in the medium width direction and on a most discharge side in the conveying direction of the head 60, and a channel (an example of the "third branched supply channel" of an aspect of the present invention) extending through the slit SL1 of the rubber sheet 23, the opening A23 of the second channel member 22, the channel ch23, the ink flow port CP23, and the ink channels $IC_{30}$, $IC_{40}$, and $IC_{50}$, to the ink flow port $IP_{60}$ on a right side in the medium width direction and on a third from the discharge side in the conveying direction of the head 60.

A channel extending from the ink flow port CP11 to the lower end portion G21$_{bt}$ provided in the second channel member 22 through the channel ch11, the second portion G112, and the first recessed groove G21, is divided into a channel (an example of the "second branched supply channel" of an aspect of the present invention) extending through the slit SL1 of the rubber sheet 23, the opening A15 of the first channel member 21, the channel ch15, the ink flow port CP15, and the ink channels $IC_{30}$, $IC_{40}$, and $IC_{50}$, to the second ink flow port $IP_{60}$ on a left side in the medium width direction and on a second from the discharge side in the conveying direction of the head 60, and a channel (an example of the "fourth branched supply channel" of an aspect of the present invention) extending through the opening A24 of the second channel member 22, the channel ch24, the ink flow port CP24, and the ink channels $IC_{30}$, $IC_{40}$, and $IC_{50}$, to the ink flow port $IP_{60}$ on a left side in the medium width direction and on a most supply side in the conveying direction of the head 60.

The channel extending from the ink flow port CP11 through the lower end portion G11$_{bt1}$ and the ink flow port CP12 to reach the ink flow port $IP_{60}$ on the right side in the medium width direction and on the most discharge side in the conveying direction is an example of the "first supply channel" of an aspect of the present invention, and the channel extending from the ink flow port CP11 through the lower end portion G11$_{bt1}$ and the ink flow port CP23 to reach the ink flow port $IP_{60}$ on the right side in the medium width direction and on the third from the discharge side is an example of the "third supply channel" of an aspect of the present invention. The channel extending from the ink flow port CP11 through the lower end portion G21$_{bt}$ and the ink flow port CP15, to reach the ink flow port $IP_{60}$ on the left side in the medium width direction and on the second from the discharge side in the conveying direction, is an example of the "second supply channel" of an aspect of the present invention, and the channel extending from the ink flow port CP11 through the lower end portion G21$_{bt}$ and the ink flow port CP24 to reach the ink flow port $IP_{60}$ on the left side in the medium width direction and on the most supply side in the conveying direction is an example of the "fourth supply channel" of an aspect of the present invention.

The ink flow port CP21 functions as the only (sole) ink discharge port of the channel member 20, and is an example of the "single discharge port" of an aspect of the present invention.

A branch channel extending from the ink flow port CP21 to the lower end portions G22$_{bt1}$ and G12$_{bt}$ is configured by the channel ch21 and the second recessed groove G22 of the second channel member 22, and the second recessed groove G12 of the first channel member 21. Said branch channel is an example of the "main discharge channel" of an aspect of the present invention.

A channel extending from the ink flow port CP21 to the lower end portion G22$_{bt1}$ through the channel ch21 and the first portion G221 is divided into a channel (an example of the "second branched discharge channel" of an aspect of the present invention) extending through the opening A13, the channel ch13, the ink flow port CP13, the ink channels $IC_{30}$, $IC_{40}$, and $IC_{50}$ to the ink flow port $IP_{60}$ on a right side in the medium width direction and on a second from the discharge side in the conveying direction of the head 60, and a channel (an example of the "fourth branched discharge channel" of an aspect of the present invention) extending through the opening A22, the channel ch22, the ink flow port CP22, and the ink channels $IC_{30}$, $IC_{40}$, and $IC_{50}$, to the ink flow port $IP_{60}$ on a right side in the medium width direction and on a most supply side in the conveying direction of the head 60.

A channel extending from the ink flow port CP21 to the lower end portion G12$_{bt}$ is divided into a channel (an example of the "first branched discharge channel" of an aspect of the present invention) extending through the opening A14, the channel ch14, the ink flow port CP14 and the ink channels $IC_{30}$, $IC_{40}$, and $IC_{50}$ to the ink flow port $IP_{60}$ on a left side in the medium width direction and a most discharge side in the conveying direction of the head 60, and a channel (an example of the "third branched discharge channel" of an aspect of the present invention) extending through the opening A25, the channel ch25, the ink flow port CP25, the ink channels $IC_{30}$, $IC_{40}$, and $IC_{50}$ to the ink flow port $IP_{60}$ on a left side in the medium width direction and a third from the discharge side in the conveying direction of the head 60.

The channel extending from the ink flow port CP21 through the lower end portion G12$_{bt}$ and the ink flow port CP14 to reach the ink flow port $IP_{60}$ on the left side in the medium width direction and the most discharge side in the conveying direction, is an example of the "first discharge channel" of an aspect of the present invention, and the channel extending from the ink flow port CP21 through the lower end portion G12$_{bt}$ and the ink flow port CP25, to reach the ink flow port $IP_{60}$ on the left side in the medium width direction and the third from the discharge side in the conveying direction, is an example of the "third discharge channel" of an aspect of the present invention. The channel extending from the ink flow port CP21 through the lower end portion G22$_{bt1}$ and the ink flow port CP13, to reach the ink flow port $IP_{60}$ on the right side in the medium width direction and the second from the discharge side in the conveying direction, is an example of the "second discharge channel" of an aspect of the present invention, and the channel extending from the ink flow port CP21 through the lower end portion G22$_{bt1}$ and the ink flow port CP22 to reach the ink flow port $IP_{60}$ on the right side in the medium width direction and the most supply side in the conveying direction, is an example of the "fourth discharge channel" of an aspect of the present invention.

Although not limited, the channel resistances of the four channels between the ink flow port CP11 and each of the four ink flow ports $IP_{60}$ of the head 60 (that is, examples of the channels of the "first supply channel" to the "fourth supply channel" of an aspect of the present invention) may be identical to each other. As a result, the ink supplied through the ink flow ports CP11 is evenly distributed to the four ink flow ports $IP_{60}$, and the dispersion of discharge from the plurality of nozzles 3 of the head 60 is suppressed. Further, although not limited, the channel resistances of the four channels between the ink flow port CP21 and each of the four ink flow ports $IP_{60}$ of the head 60 (that is, examples of the channels of the "first discharge channel" to the "fourth discharge channel" of an aspect of the present invention) may be identical to each other. As a result, the ink supplied through the ink flow ports CP11 is more evenly distributed by the four ink flow ports $IP_{60}$, and the dispersion of discharge from the plurality of nozzles 3 of the head 60 is better suppressed.

In this specification and the present invention, the expression that the channel resistance of one channel is identical to the channel resistance of the other channel does not only mean that the channel resistances of both channels are completely identical to each other, but it shall also include cases where the difference between the channel resistance of one channel and the channel resistance of the other channel is within ±5% of the value of the channel resistance of the other channel. For example, the channel resistance increases as the channel length increases, and increases as the channel cross-sectional area decreases.

Here, since the lower end portion G11$_{bt1}$ of the first recessed groove G11 is positioned at an intermediate position between the ink flow port CP12 (and the ink flow port $IP_{60}$ on the right side in the medium width direction and the most discharge side in the conveying direction) and the ink flow port CP23 (and the ink flow port $IP_{60}$ on the right side in the medium width direction and the third from the discharge side in the conveying direction) in the conveying direction, it is easy to match a channel length from the lower end portion G11$_{bt1}$ to the ink flow port CP12 with a channel length from the lower end portion G11$_{bt1}$ to the ink flow port CP23. Therefore, it is easy to match a channel resistance of the channel (an example of the "first supply channel" of an aspect of the present invention) extending from the ink flow port CP11 to the ink flow port $IP_{60}$ on the right side in the medium width direction and the most discharge side in the conveying direction with a channel resistance of the channel (an example of the "third supply channel" of an aspect of the present invention) extending from the ink flow port CP11 to the ink flow port $IP_{60}$ on the right side in the medium width direction and the third from the discharge side in the conveying direction.

Further, since the lower end portion G21$_{bt}$ of the first recessed groove G21 is positioned at an intermediate position between the ink flow port CP15 (and the ink flow port $IP_{60}$ on the left side in the medium width direction and the second from the discharge side in the conveying direction) and the ink flow port CP24 (and the ink flow port $IP_{60}$ on the left side in the medium width direction and the most supply side in the conveying direction) in the conveying direction, it is easy to match a channel length from the lower end portion G21$_{bt}$ to the ink flow port CP15 with a channel length from the lower end portion G21$_{bt}$ to the ink flow port CP24. Therefore, it is easy to match a channel resistance of the channel (an example of the "second supply channel" of an aspect of the present invention) extending from the ink flow port CP11 to the ink flow port $IP_{60}$ on the left side in the medium width direction and the second from the discharge side in the conveying direction with a channel resistance of the channel (an example of the "fourth supply channel" of an aspect of the present invention) extending from the ink flow port CP11 to the ink flow port $IP_{60}$ on the left side in the medium width direction and the most supply side in the conveying direction.

In the head system HS1 having the above described channel configuration, when the ink from the sub-tank 700 is supplied to the ink flow port CP11, the ink supplied to the ink flow port $IP_{60}$ on the right side in the medium width direction and the most discharge side in the conveying direction is distributed, while flowing leftward through the manifold M1, to the individual channels iCH communicating with the first manifold M1. The ink that has not been distributed to the individual channels iCH is returned to the sub-tank 700 through the ink flow port $IP_{60}$ on the left side in the medium width direction and the most discharge side in the conveying direction and the ink flow port CP21.

The ink supplied to the ink flow port CP11, similarly while flowing rightward through the second manifold M2, leftward through the third manifold M3, and rightward through the fourth manifold M4, is distributed to each of the individual channels iCH communicating with the respective manifolds. The ink that has not been distributed to the individual channels iCH is returned to the sub-tank 700 through the ink flow port $IP_{60}$ at end portion of each of the manifolds and the ink flow port CP21.

The ink flowing through the head 60 tends to lower the temperature and increase in viscosity as the ink goes to the downstream side of the manifold. Since a change in the viscosity of ink causes a change in discharge performance from the nozzles, when an image is formed by discharging ink from a nozzle array communicating with a manifold, the formed image may have density unevenness.

On the other hand, by making the directions of the flows of ink in two adjacent manifolds in the conveying direction opposite, (i.e., by flowing ink in a "cross-flow" manner), the unevenness of the density is canceled (averaged) between the neighboring two manifolds, and deterioration of the quality of the formed image is suppressed.

[Image Forming Method]

The image forming on the medium PM using the printer 1000 and the head unit 100 is performed as follows.

First, the medium PM in a feed tray (not depicted) is sent to the supply side of the conveying roller 501 and is sent onto the platen 400 by the conveying roller 501. A plurality of head systems HS1 of the head unit 100 continuously discharge ink droplets onto the medium PM transported in the conveying direction by the conveying rollers 501 and 502, and an image is formed on the medium PM. The medium PM on which the image has formed is sent to the discharge side of the conveying roller 502 and is discharged to a discharge tray (not depicted).

Discharge of ink droplets using the head system HS1 is performed by applying pressure to the ink in a predetermined pressure chamber 1 (referred to as "target pressure chamber") using the piezoelectric actuator 62. Specifically, first, a driver IC of the control board 82 applies a driving potential to the individual electrode iET corresponding to the target pressure chamber through the FPC 81 under the instruction of the control device CONT. As a result, an electric field parallel to the polarization direction is generated in the active portion AC sandwiched between the individual electrode iET to which the drive potential is applied and the common electrode cET, and the active portion AC contracts in the horizontal direction orthogonal to the polarization direction. As a result, the ink sealing film 61A above the target pressure chamber vibrates, pressure is applied to the ink in the target pressure chamber, and ink droplets are discharged from the nozzle 3 communicating with the pressure chamber 1 through the descender channel 2.

Ink in the sub-tank 700 is continuously supplied to the pressure chamber 1 through the channel member 20, the manifolds M1 to M4, and the like. Among the inks in the manifolds M1 to M4, the ink that has not been supplied to the pressure chamber 1 is sent to the sub-tank 700 through the channel member 20.

The effects of the head system HS1 of the first embodiment are summarized below.

In the head system HS1 of the first embodiment, a cross flow in the head 60 is achieved by using the channel member 20. In general, in order to achieve a cross flow, in a head, in which ink flows in different directions between one manifold and another manifold adjacent to the one manifold, the channels for supplying ink to the head and collecting ink from the head were complicated and miniaturization of the head system was difficult.

Specifically, for example, as in Japanese Patent Application Laid-Open No. JP2021-160345, in a channel member in which two lines of channels separated by a rubber sheet are configured, and which has two supply ports and two discharge ports, two ink supply pipes and two ink discharge pipes are required to connect the channel member and a sub-tank. Therefore, the structure of a connector (joint) for connecting the four pipes (that is, two ink supply pipes and two ink discharge pipes) and the channel member becomes complicated, and the head system becomes large, for example in a vertical direction (height direction). In addition, since two lines of branch channels extending from the supply port to both sides in a medium width direction (the direction in which the nozzle array extends) are constituted inside the channel member, and two lines of branch channels extending from the discharge port to both sides in the medium width direction are also constituted inside the channel member, the total length of the channel inside the channel member becomes large, and the size of the channel member itself becomes large.

On the other hand, the channel member 20 included in the head system HS1 of the first embodiment distributes the ink supplied from the single supply port (ink channel CP11) to the four ink flow ports $IP_{60}$ on both sides of the head 60 in the medium width direction using only one system of branch channel from the supply port heading both sides in the medium width direction by providing a supply channel straddling (across) the first channel member 21 and the second channel member 22. Similarly, the channel member 20 collects the ink from the four ink flow ports $IP_{60}$ at both sides of the head 60 in the medium width direction to a single discharge port, using only one system of branch channel from the single discharge port (ink channel CP21) heading both sides in the medium width direction by providing a discharge channel straddling (across) the first channel member 21 and the second channel member 22. In other words, the ink from the single supply port is distributed to the four ink flow ports $IP_{60}$ using a channel that branches in two steps, and the ink from the four ink flow ports $IP_{60}$ is collected to the single ink discharge port using a channel that branches in two steps.

Therefore, in the head system HS1 of the first embodiment, it is possible to miniaturize the connection structure between the channel member 20 and the ink supply pipe and the ink discharge pipe. In addition, it is possible to shorten the total channel length of the channel member 20, and the channel member 20 itself may be miniaturized.

In addition, when the channel member has a plurality of supply ports and has a plurality of recovery ports, the manufacturing cost of the channel member tends to increase. On the other hand, in the head system HS1 of the first embodiment, since the channel member 20 has a single supply port and a single discharge port, manufacturing costs may be suppressed.

In addition, in the head system HS1 of the first embodiment, since the channel member 20 has a single supply port and a single discharge port, the diameters of the supply port and the discharge port may be increased and the O-rings provided at the supply port and the discharge port may be also enlarged. As a result, leakage of ink from the supply port and the discharge port may be better suppressed. Further, by increasing the diameters of the supply port and the discharge port, the flow resistance of the channel inside the channel member 20 may be reduced, and the pressure adjustment of the nozzle 3 may be facilitated.

Second Embodiment

Figure 12:
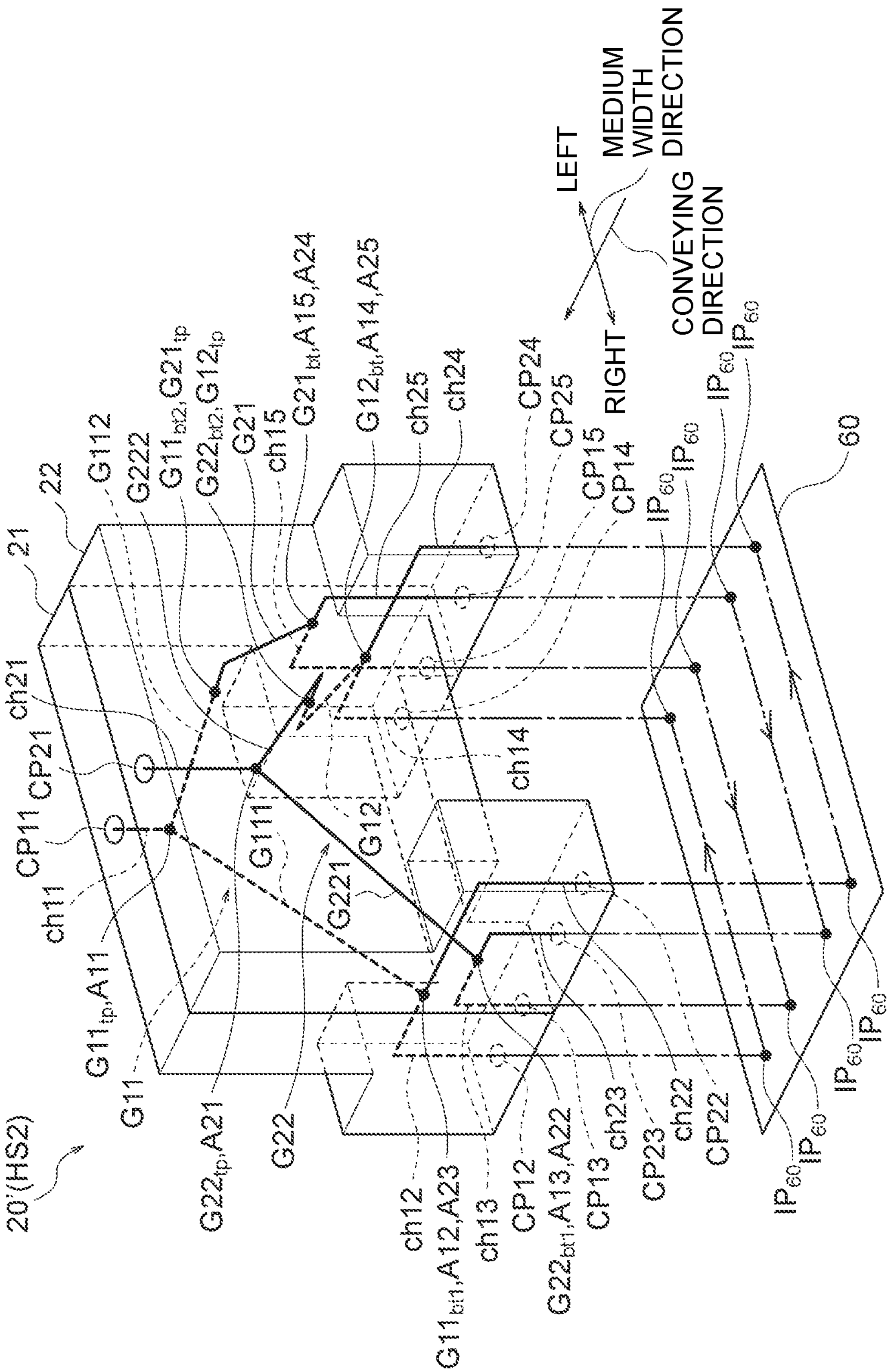
FIG. 12 is an explanatory diagram explaining the channels in the head system.

A head system HS2 according to a second embodiment of the present disclosure will be explained with reference to FIG. 12. In FIG. 12, the channel formed inside the first channel member is indicated by a broken line, the channel formed inside the second channel member is indicated by a solid line, and the channel formed outside the first channel member and the second channel member is indicated by a dashed line.

The head system HS2 of the second embodiment is identical to the head system HS1 of the first embodiment except that it has a channel member 20' instead of the channel member 20. The description of the configuration, of the head system HS2, identical to the head system HS1 of the first embodiment will be omitted.

As depicted in FIG. 12, in the channel member 20', an upper end portion of the channel ch22 is connected to the lower end portion G11$_{bt1}$ of the first recessed groove G11 through the opening A23, and an upper end portion of the channel ch23 is connected to the lower end portion G22$_{bt1}$ of the second recessed groove G22 through the opening A22. In the channel member 20', an upper end portion of the channel ch24 is connected to the lower end portion G12$_{bt}$ of the second recessed groove G12 through the opening A25, and an upper end portion of the channel ch25 is connected to the lower end portion G21$_{bt}$ of the first recessed groove G21 through the opening A24. Other configurations, of the channel member 20', are identical to the channel member 20 of the first embodiment.

In the head system HS2 of the second embodiment, a channel (an example of the "first supply channel" of an aspect of the present invention) extending from the ink flow port CP11 to the ink supply port IP$_{60}$ on a right side in the medium width direction and a most discharge side in the conveying direction through the lower end portion G11$_{bt1}$, the channel ch12, and the ink flow port CP12, and a channel (an example of the "fourth supply channel" of an aspect of the present invention) extending from the ink flow port CP11 to the ink supply port IP$_{60}$ on a right side in the medium width direction and a most supply side in the conveying direction through the lower end portion G11$_{bt1}$, the channel ch22, and the ink flow port CP22, are configured. In addition, a channel (an example of the "second supply channel" of an aspect of the present invention) extending from the ink flow port CP11 to the ink supply port IP$_{60}$ on a left side in the medium width direction and a second from the discharge side in the conveying direction through the lower end portion G21$_{bt}$, the channel ch15, and the ink flow port CP15, and a channel (an example of the "third supply channel" of an aspect of the present invention) extending from the ink flow port CP11 to the ink supply port IP$_{60}$ on a left side in the medium width direction and a third from the discharge side in the conveying direction through the lower end portion G21$_{bt}$, the channel ch25, and the ink flow port CP25, are configured.

In the head system HS2 of the second embodiment, a channel (an example of the "first discharge channel" of an aspect of the present invention) extending from the ink flow port CP21 to the ink supply port IP$_{60}$ on a left side in the medium width direction and a most discharge side in the conveying direction through the lower end portion G12$_{bt}$, the channel ch14, and the ink flow port CP14, and a channel (an example of the "fourth discharge channel" of an aspect of the present invention) extending from the ink flow port CP21 to the ink supply port IP$_{60}$ on a left side in the medium width direction and a most supply side in the conveying direction through the lower end portion G12$_{bt}$, the channel ch24, and the ink flow port CP24, are configured. Also, a channel (an example of the "second discharge channel" of an aspect of the present invention) extending from the ink flow port CP21 to the ink supply port IP$_{60}$ on a right side in the medium width direction and a second from the discharge side in the conveying direction through the lower end portion G22$_{bt1}$, the channel ch13, and the ink flow port CP13, and a channel (an example of the "third discharge channel" of an aspect of the present invention) extending from the ink flow port CP21 to the ink supply port IP$_{60}$ on a right side in the medium width direction and a third from the discharge side in the conveying direction through the lower end portion G22$_{bt1}$, the channel ch23, and the ink flow port CP23, are configured.

Regarding the head system HS2 of the second embodiment, in the first manifold M1 and the fourth manifold M4, the ink flows leftward, and in the second manifold M2 and the third manifold M3, the ink flows rightward. Such ink flows in the first manifold M1 to the fourth manifold M4 are also one aspect of cross flow.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification

The following modifications may be also used in the head system HS1 of the first embodiment and the head system HS2 of the second embodiment.

In the head system HS1 of the first embodiment and the head system HS2 of the second embodiment, a channel for ink discharge (draining) may be omitted. That is, the head system HS1 and the head system HS2 may be configured to only supply ink to the head 60 and discharge (eject) the ink from the nozzles 3. Further, in the head system HS1 of the first embodiment and the head system HS2 of the second embodiment, the ink flow port CP21 of the channel member 20 may be used as an ink supply port, and the ink flow port CP11 may be used as an ink discharge (draining) port.

In the head system HS1 of the first embodiment and the head system HS2 of the second embodiment, instead of the slits SL1 and SL2, the rubber sheet 23 may be a sheet provided with an opening only at a portion where a channel across the first channel member 21 and the second channel member 22 is formed. Alternatively, instead of the rubber sheet 23, an annular packing may be used that surrounds the edge of the channel (the edge of the channel when viewed in the conveying direction). Also, instead of the rubber sheet 23, a sheet formed of a highly rigid material such as a resin film and the like may be used. The annular packing and the highly rigid sheet are also examples of the seal of an aspect of the present invention.

In the head system HS1 of the first embodiment and the head system HS2 of the second embodiment, the channel member 20 may not have the rubber sheet 23, and may not have the first pressing plate 24 or the second pressing plate 25.

In the head system HS1 of the first embodiment and the head system HS2 of the second embodiment, the configurations of the channel in the channel member 20 are not limited to those described above. The channel for ink supply may be an arbitrary channel that extends from a single supply port and extends straddling (across) the first channel member 21 and the second channel member 22 so as to supply ink to the head 60 in the cross flow manner. In addition, the channel for ink discharge may be an arbitrary channel that extends straddling (across) the first channel member 21 and the second channel member 22 so as to send the ink flowed in the head 60 in the cross-flow manner to a single discharge port.

In the above, the embodiments and the modified examples have been explained by taking as an example the case where ink is discharged from the head systems HS1 and HS2 to form an image on the medium PM. The head systems HS1 and HS2 may be liquid discharge systems that discharge an arbitrary liquid (for example, UV ink) for image forming and the medium PM on which the image is formed, may be paper, cloth, resin, or the like, for example. Also, the head systems HS1 and HS2 may be used as a head system for a serial head type printer.

The embodiments described in the present specification are to be considered in all respects as illustrative and not restrictive. For example, the number, configuration, or the like of the head units 100 may be changed. The number of colors that can be printed simultaneously by the printer 1000 is not limited, and a configuration may be such that only single-color printing is possible. Also, the number, arrangement, or the like of the individual channels iCH may be changed as appropriate. Moreover, the technical features described in each embodiment may be combined with each other.

In the above description, while the head systems HS1 and HS2 are arranged so that the first channel members 21 of the channel members 20 and 20' are positioned on the discharge side in the conveying direction, and the second channel member 22 is positioned on the supply side in the conveying direction, it is not limited to this. For example, the head systems HS1 and HS2 may be arranged so that the first channel member 21 is positioned on the supply side in the conveying direction and the second channel member 22 is positioned on the discharge side in the conveying direction. Further, the head systems HS1 and HS2 may be arranged so that the first channel members 21 and the second channel members 22 of the channel members 20 and 20' face each other in the medium width direction.

As long as the features of the present invention are maintained, the present invention is not limited to the above-described embodiments, and other forms conceivable within the scope of the technical idea of the present invention are also included in the scope of the present invention.

What is claimed is:

1. A head system comprising:

a head configured to discharge a liquid; and a channel member arranged above the head, the channel member being configured to supply the liquid to the head; wherein:

the head includes four manifolds each having:

a common channel extending in a first direction and connected to a plurality of nozzles; and an inlet connected to an end, in the first direction, of the common channel;

the four manifolds include a first manifold, a second manifold, a third manifold and a fourth manifold arranged in an order of the first manifold, the second manifold, the third manifold and the fourth manifold along a second direction orthogonal to the first direction;

the channel member includes:

a first member having a supply port being single supply port of the channel member; and a second member facing the first member in the second direction;

the channel member is formed with a first supply channel extending between the supply port and the inlet of the first manifold, a second supply channel extending between the supply port and the inlet of the second manifold, a third supply channel extending between the supply port and the inlet of the third manifold, and a fourth supply channel extending between the supply port and the inlet of the fourth manifold;

in a first manifold group including two of the four manifolds, the inlet is connected to the end, on a first side in the first direction, of the common channel, and in a second manifold group including remaining two of the four manifolds, the inlet is connected to the end, on a second side in the first direction, of the common channel;

the first manifold group includes the first manifold and the third manifold and the second manifold group includes the second manifold and the fourth manifold, or the first manifold group includes the first manifold and the fourth manifold and the second manifold group includes the second manifold and the third manifold; and each of the third supply channel and the fourth supply channel is formed in both the first member and the second member.

2. The head system according to claim 1, wherein:

the first supply channel includes a main supply channel extending from the supply port, and a first branched supply channel extending between a downstream end of the main supply channel and the inlet of the first manifold;

the second supply channel includes the main supply channel and a second branched supply channel extending between the downstream end of the main supply channel and the inlet of the second manifold;

the third supply channel includes the main supply channel and a third branched supply channel extending between the downstream end of the main supply channel and the inlet of the third manifold; and the fourth supply channel includes the main supply channel and a fourth branched supply channel extending between the downstream end of the main supply channel and the inlet of the fourth manifold.

3. The head system according to claim 2, wherein:

the channel member further includes a seal sandwiched between the first member and the second member; and the liquid is supplied from the supply port of the first member to the third branched supply channel and the fourth branched supply channel in the second member through the seal.

4. The head system according to claim 3, wherein:

the supply port is provided in a center of the first member in the first direction;

the main supply channel includes a first main supply channel extending from the supply port to the first side in the first direction, and a second main supply channel extending from the supply port to the second side in the first direction;

in a case that the first manifold group includes the first manifold and the third manifold and the second manifold group includes the second manifold and the fourth manifold, the first main supply channel is connected to the first branched supply channel and the third branched supply channel, and the second main supply channel is connected to the second branched supply channel and the fourth branched supply channel, or in a case that the first manifold group includes the first manifold and the fourth manifold and the second manifold group includes the second manifold and the third manifold, the first main supply channel is connected to the first branched supply channel and the fourth branched supply channel, and the second main supply channel is connected to the second branched supply channel and the third branched supply channel.

5. The head system according to claim 4, wherein:

the first main supply channel is connected to the first branched supply channel and the third branched supply channel, and the second main supply channel is connected to the second branched supply channel and the fourth branched supply channel;

the second main supply channel extends from the supply port to the second member through the seal;

the second branched supply channel extends from a downstream end, of the second main supply channel, provided in the second member to the first member through the seal and is connected to the inlet of the second manifold; and the fourth branched supply channel extends in the second member from the downstream end, of the second main supply channel, provided in the second member, and is connected to the inlet of the fourth manifold.

6. The head system according to claim 4, wherein:

the first main supply channel is connected to the first branched supply channel and the third branched supply channel, and the second main supply channel is connected to the second branched supply channel and the fourth branched supply channel;

the first branched supply channel extends in the first member from a downstream end, of the first main supply channel, provided in the first member, and is connected to the inlet of the first manifold; and the third branched supply channel extends from the downstream end, of the first main supply channel, provided in the first member to the second member through the seal and is connected to the inlet of the third manifold.

7. The head system according to claim 3, wherein the seal is an elastic member.

8. The head system according to claim 2, wherein, in the head, each of the four manifolds includes an outlet connected to the end in the first direction of the common channel, the end being opposite to the end connected to the inlet.

9. The head system according to claim 8, wherein:

the second member of the channel member has a discharge port being single discharge port of the channel member; and the channel member is formed with:

a first discharge channel formed in both the first member and the second member so as to extend between the discharge port and the outlet of the first manifold, a second discharge channel formed in both the first member and the second member so as to extend between the discharge port and the outlet of the second manifold, a third discharge channel extending between the discharge port and the outlet of the third manifold, and a fourth discharge channel extending between the discharge port and the outlet of the fourth manifold; and in the first manifold group, the outlet is connected to the end on the second side in the first direction of the common channel, and in the second manifold group, the outlet is connected to the end on the first side in the first direction of the common channel.

10. The head system according to claim 9, wherein the first discharge channel includes a main discharge channel extending from the discharge port and a first branched discharge channel extending between an upstream end of the main discharge channel and the outlet of the first manifold;

the second discharge channel includes the main discharge channel and a second branched discharge channel extending between the upstream end of the main discharge channel and the outlet of the second manifold;

the third discharge channel includes the main discharge channel and a third branched discharge channel extending between the upstream end of the main discharge channel and the outlet of the third manifold;

the fourth discharge channel includes the main discharge channel and a fourth branched discharge channel extending between the upstream end of the main discharge channel and the outlet of the fourth manifold;

the main supply channel, the first branched supply channel, the second branched supply channel, the first branched discharge channel, and the second branched discharge channel are formed in the first member; and the main discharge channel, the third branched supply channel, the fourth branched supply channel, the third branched discharge channel, and the fourth branched discharge channel are formed in the second member.

11. The head system according to claim 1, wherein the channel member further includes:

a first metal plate provided such that the first member is interposed between the first metal plate and the second member, the first metal plate being configured to press the first member toward the second member; and a second metal plate provided such that the second member is interposed between the second metal plate and the first member, the second metal plate being configured to press the second member toward the first member.

12. The head system according to claim 11, wherein the first metal plate and the second metal plate are screwed to each other.

13. The head system according to claim 1, wherein a channel resistance of the first supply channel, a channel resistance of the second supply channel, a channel resistance of the third supply channel, and a channel resistance of the fourth supply channel are identical to each other.

14. The head system according to claim 1, further comprising a heater provided between the head and the channel member, the heater being configured to heat the liquid in the head.

15. A printing devise comprising:

the head system as defined in claim 1; and a conveyer configured to convey a medium to which an image is to be formed by the head system.

* * * * *